US007177066B2

(12) United States Patent
Chung et al.

(10) Patent No.: US 7,177,066 B2
(45) Date of Patent: Feb. 13, 2007

(54) ELECTROPHORETIC DISPLAY DRIVING SCHEME

(75) Inventors: Jerry Chung, Mountain View, CA (US); Wanheng Wang, Sunnyvale, CA (US); Yajuan Chen, Fremont, CA (US); Wei Yao, Fremont, CA (US); Jack Hou, Fremont, CA (US); Li-Yang Chu, Brea, CA (US)

(73) Assignee: Sipix Imaging, Inc., Fremont, CA (US)

( * ) Notice: Subject to any disclaimer, the term of this patent is extended or adjusted under 35 U.S.C. 154(b) by 0 days.

(21) Appl. No.: 10/973,810

(22) Filed: Oct. 25, 2004

(65) Prior Publication Data

US 2005/0146775 A1 Jul. 7, 2005

Related U.S. Application Data

(60) Provisional application No. 60/514,412, filed on Oct. 24, 2003, provisional application No. 60/580,807, filed on Jun. 18, 2004.

(51) Int. Cl.
*G02B 26/00* (2006.01)

(52) U.S. Cl. ....................... 359/296; 359/295; 345/107

(58) Field of Classification Search ................ 359/296, 359/295, 243, 245; 345/107
See application file for complete search history.

(56) References Cited

U.S. PATENT DOCUMENTS

| | | | | |
|---|---|---|---|---|
| 3,612,758 | A | 10/1971 | Evans et al. | 348/5.4 R |
| 5,930,026 | A | 7/1999 | Jacobson et al. | 359/296 |
| 5,961,804 | A | 10/1999 | Jacobson et al. | 204/606 |
| 6,657,612 | B2 * | 12/2003 | Machida et al. | 345/107 |
| 2002/0021483 | A1 * | 2/2002 | Katase | 359/267 |
| 2003/0035885 | A1 | 2/2003 | Zang et al. | 427/58 |
| 2003/0067666 | A1 | 4/2003 | Kawai | 359/296 |
| 2004/0120024 | A1 | 6/2004 | Chen et al. | 359/237 |
| 2004/0219306 | A1 | 11/2004 | Wang et al. | 428/1.5 |
| 2005/0162377 | A1 * | 7/2005 | Zhou et al. | 345/107 |

FOREIGN PATENT DOCUMENTS

WO WO 01/67170 9/2001

OTHER PUBLICATIONS

Allen, K. (Oct. 2003). Electrophoretics Fulfilled. *Emerging Displays Review: Emerging Display Technologies, Monthly Report*—9-14.

(Continued)

*Primary Examiner*—Timothy Thompson
*Assistant Examiner*—Jerry Fang
(74) *Attorney, Agent, or Firm*—Hickman Palermo Truong & Becker LLP

(57) ABSTRACT

A system and method are disclosed for reducing reverse bias in an electrophoretic display. The system and method include the application of varying levels of voltages across an array of electrophoretic display cells of the electrophoretic display to move the cells towards a stable state in a driving cycle. In addition, the system and method disconnect the voltages from the electrophoretic display cells at a time duration prior to reaching step transitions of the voltages during the driving cycle. Pre-driving approaches apply a first pre-driving voltage at a first polarity to the display cells before driving the display cells with a second driving voltage at a second, opposite polarity. Varying the time duration and amplitude of the pre-driving signals produces further beneficial reduction in reverse bias.

14 Claims, 19 Drawing Sheets

OTHER PUBLICATIONS

Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, I9.6.1.

Howard, Robert E., "Better Displays with Organic Films," Scientific American, Feb. 2004, pp. 76-81.

Chen, S.M. (Jul. 2003) The Applications for the Revolutionary Electronic Paper Technology. *OPTO News & Letters*, 102, 37-41. (in Chinese, English abstract attached, full translation available upon request).

Chen, S.M. (May 2003) The New Applications and the Dynamics of Companies. *TRI*. 1-10. (In Chinese, English abstract attached, full translation availabe upon request).

Chung, J., Hou, J., Wang, W., Chu, L.Y., Yao, W., & Liang, R.C. (Dec. 2003). Microcup(R) Electrophoretic Displays, Grayscale in Color Rendition. *IDW*, AMD2/EP1-2, 243-246.

Ho, C., & Liang, R.C. (Dec. 2003). *Microcup (R) Electronic Paper by Roll-to-ROll Manufacturing Processes*. Presentation conducted at FEG, Nei-Li, Taiwan.

Hopper, & Novotny, (1979) An Electrophoretic Display, Its Properties, Model and Addressing. *IEEE Trans. Electr. Dev.*, ED 26, No. 8, pp. 1148-1152.

Hou, J., Chen, Y., Li, Y., Weng, X., Li., H. And Pereira, C. (May 2004). Reliability and Performance of Flexible Electrophoretic Displays by Roll-to-Roll Manufacturing Processes. *SID Digest*, 32.3, 1066-1069.

Lee, H., & Liang, R.C. (Jun. 2003) SiPix Microcup(R) Electronic Paper—An Introduction. *Advanced Display*, Issue 37, 4-9 (in Chinese, English abstract attached, full translation available upon request).

Liang, R.C. (Feb. 2003) *Microcup(R) Electrophoretic and Liquid Crystal Displays by Roll-to-Roll Manufacturing Processes*. Presentation conducted at the Flexible Microeletronics & Displays Conference of U.S. Display Consortium, Phoenix, Arizona, USA.

Liang, R.C. (Apr. 2004). *Microcup Electronic Paper by Roll-to-Roll Manufacturing Process*. Presentation at the Flexible Displays & Electronics 2004 of Intertech, San Francisco, California, USA.

Liang, R.C. (Oct. 2004) *Flexible and Roll-able Display/Electronic Paper—A Technology Overview*. Paper presented at the METS 2004 Conference in Taipie, Taiwan.

Liang, R.C., Hou, J., Chung, J., Wang, X., Pereira, C., & Chen, Y. (2003). Microcup(R) Active and Passive Matrix Electrophoretic Displays by A Roll-to-Roll Manufacturing Processes. *SID Digest*, 20.1.

Liang, R.C., Hou, J., & Zang, H.M. (Dec. 2002) Microcup Electrophoretic Displays by Roll-to-Roll Manufacturing Processes. *IDW*, EP2-2, 1337-1340.

Liang, R.C., Hou, J., & Chung, J. (Feb. 2003). *Passive Matrix Microcup(R) Electrophoretic Displays*. Paper presented at the IDMC, Taipei, Taiwan.

Liang, R.C., Hou, J., Zang, H.M., Chung, J., & Tseng, S. (2003). Microcup(R) displays : Electronic Paper by Roll-to-Roll Manufacturing Processes. *Journal of the SID*, 11(4), 621-628.

Liang, R.C., Zang, H.M., Wang, X., Chung, J. & Lee, H., (Jun./Jul. 2004) << Format Flexible Microcup (R) Electronic Paper by Roll-to-Roll Manufacturing Process>>, Presentation conducted at the 14th FPD Manufacturing Technology EXPO & Conference.

Liang, R.C. & Tseng, S. (Feb. 2003). *Microcup(R) LCD, An New Type of Dispersed LCD by A Roll-to-Roll Manufacturing Process*. Paper presented at the IDMC, Taipei, Taiwan.

Nikkei Microdevices. (Dec. 2002) Newly-Developed Color Electronic Paper Promises—Unbeatable Production Efficiency. *Nikkei Microdevices, 3*. (in Japanese, with English translation).

Wang, X., Kiluk, S., Chang, C., & Liang, R.C. (Feb. 2004). Microcup (R) Electronic Paper and the Converting Processes. *ASID*, 10.1.2-26, 396-399, Nanjing, China.

Wang, X., Kiluk, S., Chang, C., & Liang, R.C., (Jun. 2004) Microcup® Electronic Paper and the Converting Processes. *Advanced Display*, Issue 43, 48-51.

Zang, H.M. (Feb. 2004). *Microcup Electronic Paper*. Presentation conducted at the Displays & Microelectronics Conference of U.S. Display Consortium, Phoenix, Arizona, USA.

Zang, H.M. (Oct. 2003). *Microcup (R) Electronic Paper by Roll-to-Roll Manufacturing Processes*. Presentation conducted at the Advisory Board Meeting, Bowling Green State University, Ohio, USA.

Zang, H.M., & Liang, R.C. (2003) Microcup Electronic Paper by Roll-to-Roll Manufacturing Processes. *The Spectrum*, 16(2), 16-21.

Zang, H.M, Hwang, J.J., Gu, H., Hou, J., Weng, X., Chen, Y., et al. (Jan. 2004). Threshold and Grayscale Stability of Microcup (R) Electronic Paper. *Proceeding of SPIE-IS&T Electronic Imaging, SPIE* vol. 5289, 102-108.

* cited by examiner

Pre-Driving and Driving Phases have Same Voltage Amplitude and Same Duration (Reverse Bias is Present For the Black Pixel)

Pre-Driving Phase has a Longer Driving Duration than the Driving Phase (Black Pixel)

Pre-driving Phase has a Higher Driving Voltage Amplitude than the Driving Phase (Black Pixel)

Pre-Driving Phase has a Longer Driving Duration than the Driving Phase (White Pixel)

Pre-driving Phase has a Higher Driving Voltage Amplitude than the Driving Phase (White Pixel)

Pre-Driving Phase has a Higher Driving Voltage Amplitude and a Longer Driving Duration than the Driving Phase (Black Pixel)

Pre-driving Phase has a Higher Driving Voltage Amplitude and a Longer Driving Duration than the Driving Phase (White Pixel)

Driving Scheme I

Driving Scheme II

Driving Scheme III

Driving Scheme IV

Driving Scheme V

ELECTROPHORETIC DISPLAY DRIVING SCHEME

CROSS-REFERENCE TO RELATED APPLICATIONS; PRIORITY CLAIM

This application claims domestic priority under 35 U.S.C. §119(e) from U.S. Provisional Application Nos. 60/514,412, filed on Oct. 24, 2003, and 60/580,807, filed on Jun. 18, 2004, the entire contents of which is hereby incorporated into this application by reference for all purposes as if fully set forth herein.

FIELD OF THE INVENTION

The present invention relates generally to electrophoretic displays. More specifically, an improved driving scheme for an electrophoretic display is disclosed.

BACKGROUND OF THE INVENTION

The electrophoretic display (EPD) is a non-emissive device based on the electrophoresis phenomenon of charged pigment particles suspended in a solvent. It was first proposed in 1969. The display usually comprises two plates with electrodes placed opposing each other, separated by using spacers. One of the electrodes is usually transparent. A suspension composed of a colored solvent and charged pigment particles is enclosed between the two plates. When a voltage difference is imposed between the two electrodes, the pigment particles migrate to one side and then either the color of the pigment or the color of the solvent can be seen according to the polarity of the voltage difference.

There are several different types of EPDs. In the partition type of EPD (see M. A. Hopper and V. Novotny, IEEE Trans. Electr. Dev., Vol. ED 26, No. 8, pp. 1148–1152 (1979)), there are partitions between the two electrodes for dividing the space into smaller cells in order to prevent undesired movement of particles such as sedimentation. The microcapsule type EPD (as described in U.S. Pat. No. 5,961,804 and U.S. Pat. No. 5,930,026) has a substantially two dimensional arrangement of microcapsules each having therein an electrophoretic composition of a dielectric solvent and a suspension of charged pigment particles that visually contrast with the solvent. Another type of EPD (see U.S. Pat. No. 3,612,758) has electrophoretic cells that are formed from parallel line reservoirs. The channel-like electrophoretic cells are covered with, and in electrical contact with, transparent conductors. A layer of transparent glass from which side the panel is viewed overlies the transparent conductors. Yet another type of EPD comprises closed cells formed from microcups of well-defined shape, size and aspect ratio and filled with charged pigment particles dispersed in a dielectric solvent, as disclosed in co-pending application U.S. Ser. No. 09/518,488, filed on Mar. 3, 2000.

One problem associated with these EPDs is reverse bias. A reverse bias condition could occur when the bias voltage on a particular cell changes rapidly by a large increment or decrement and in conjunction with the presence of a stored charge resulting from the inherent capacitance of the materials and structures of the EPD. The reverse bias condition affects display quality by causing charged pigment particles in affected cells to migrate away from the position to which they have been driven. The following description along with FIGS. 1A, 1B, and 2 further illustrate this problem.

FIG. 1A shows a sectional view of an example EPD 100. The EPD 100 includes an upper dielectric layer 108, an upper electrode 112, an electrophoretic dispersion layer 102, a lower dielectric layer 110, and a lower electrode 114. The electrophoretic dispersion layer 102 contains a colored dielectric solvent 106 with a plurality of charged pigment particles 104. In one embodiment, the insulating material of the dielectric layers may comprise a non-conductive polymer. In another embodiment, the insulating material may include a microcup structure or a sealing and/or adhesive layer, as disclosed, for example, in co-pending applications, U.S. Ser. No. 09/518,488, filed on Mar. 3, 2000, U.S. Ser. No. 10/222,297, filed on Aug. 16, 2002, U.S. Ser. No. 10/665,898, filed on Sep. 18, 2003 and U.S. Ser. No. 10/762,196, filed on Jan. 21, 2004.

FIG. 1B shows a simplified electrical equivalent circuit for EPD 100. Specifically, C1 and R1 represent the combined electrical capacitance and resistance of the upper dielectric layer 108 and the lower dielectric layer 110, respectively. C2 and R2 represent the electrical capacitance and resistance of the electrophoretic dispersion layer 102, respectively.

Suppose drive voltage generator 116 applies a square wave $V_{in}$ to the upper electrode 112 and the lower electrode 114. The waveform of the voltage applied across the electrophoretic dispersion layer 102, $V_{ed}$, has overshooting and undershooting portions as shown in FIG. 2. Particularly, when $V_{in}$ drops to zero, $V_{ed}$ has a polarity opposite to the drive voltage $V_{in}$. This "undershooting", representing the reverse bias condition, causes charged particles to migrate away from a position to which they have been driven and results in degradation of the image-retention characteristics of the EPD 100.

One solution to the aforementioned reverse bias problem has been disclosed by Hideyuki Kawai in application U.S. Ser. No. 10/224,543, filed Aug. 20, 2002, U.S. patent publication 20030067666, published Apr. 10, 2003. The solution attempts to address the undershooting phenomenon by applying an input biasing voltage that has a smooth waveform and meets certain time constant requirements. However, this solution is difficult and costly to implement. Therefore, there is a need for an improved driving scheme for an EPD.

DETAILED DESCRIPTION

The present invention can be implemented in numerous ways, including as a process, an apparatus, a system, or a computer readable medium such as a computer readable storage medium or a computer network wherein program instructions are sent over optical or electronic communication links. The order of the steps of disclosed processes may be altered within the scope of the invention.

A detailed description of one or more preferred embodiments of the invention is provided below with drawing figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

The whole content of each document referred to in this application is incorporated by reference into this application in its entirety for all purposes as if fully set forth herein.

Figure 1A:
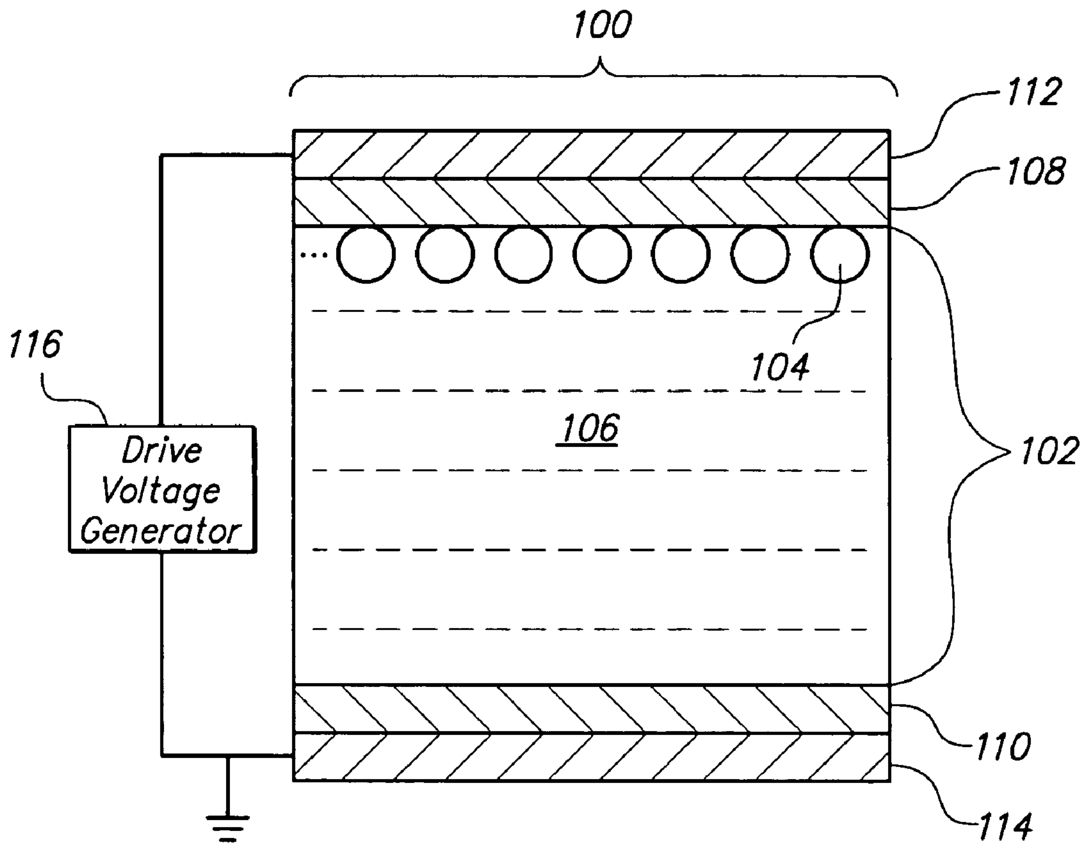
FIG. 1A illustrates a sectional view of an example electrophoretic display.
Figure 1B:
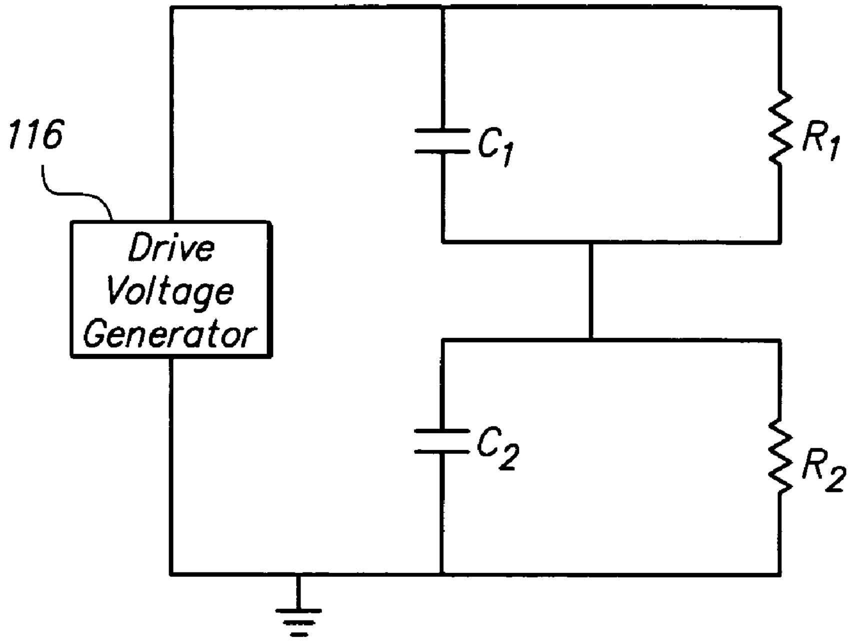
FIG. 1B illustrates a simplified electrical equivalent circuit for a portion of the EPD 100.
Figure 2:
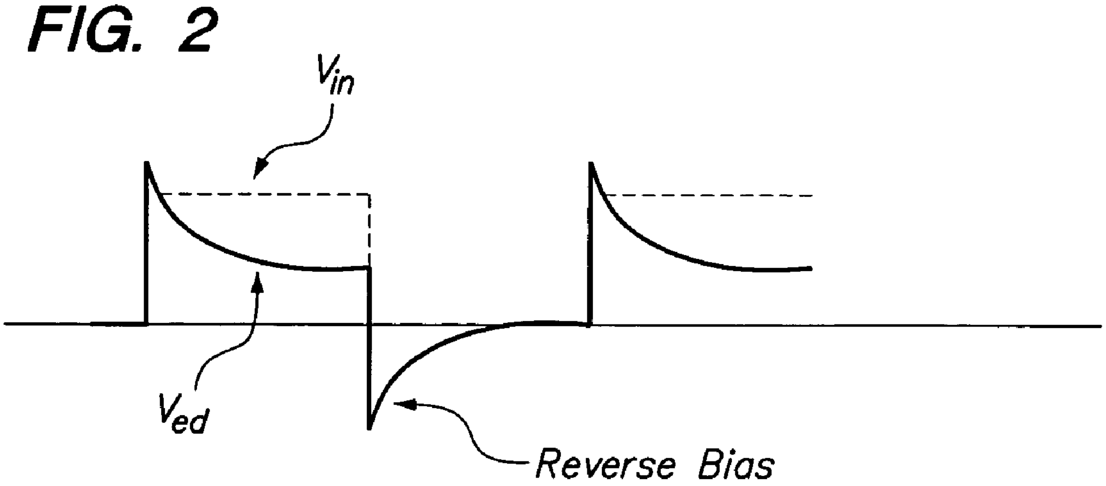
FIG. 2 illustrates the induced reverse bias effect.
Figure 3:
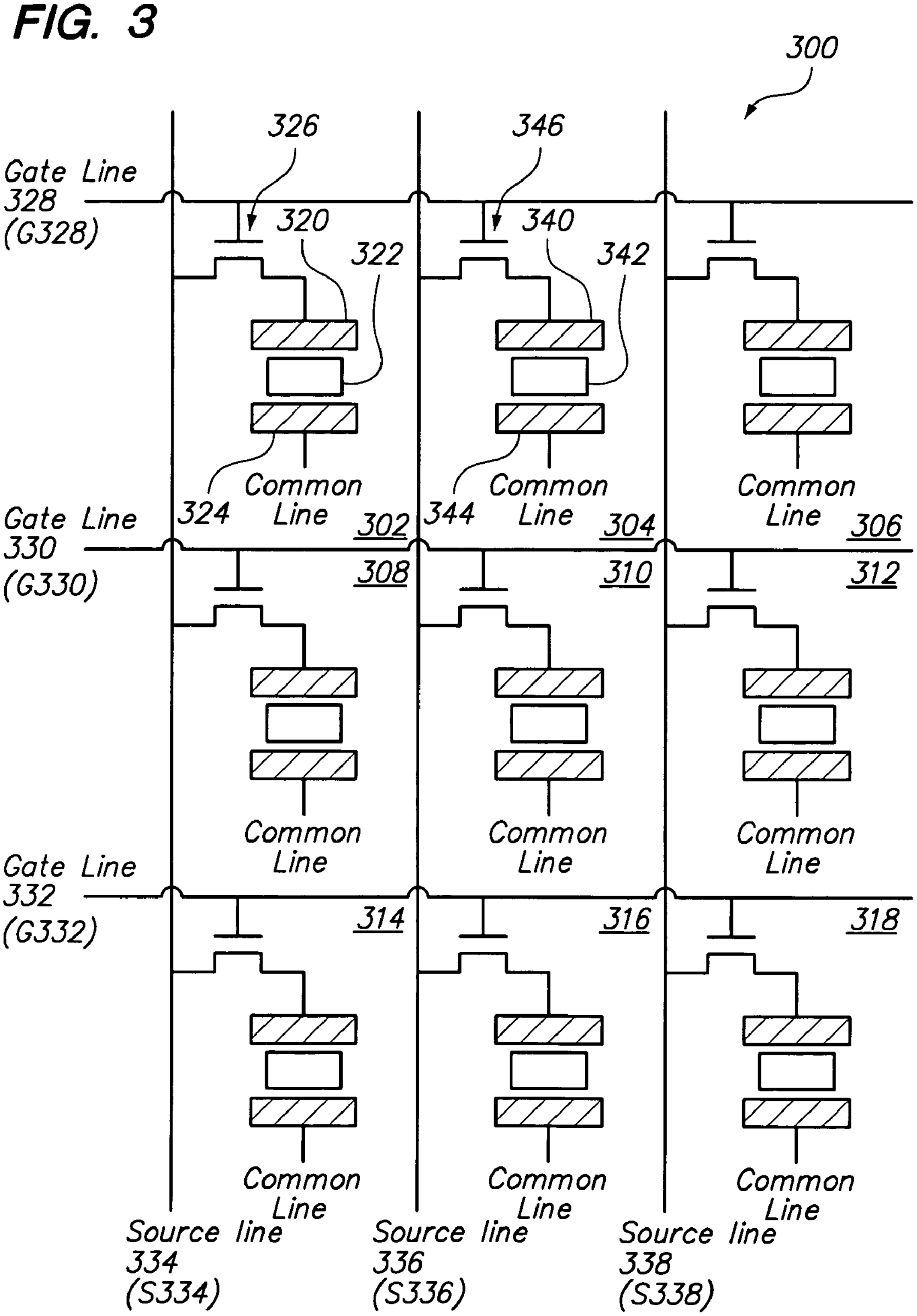
FIG. 3 illustrates one example characterization of the electrical connectivity between the drive voltage generator 116 and a 3×3 array portion 300 of the EPD 100 in an active matrix implementation.

A. Overview of the Electrical Connectivity Between the Drive Voltage Generator and the EPD In an active matrix implementation of the EPD 100 as shown in FIG. 1A, FIG. 3 illustrates one example characterization of the electrical connectivity between the drive voltage generator 116 and a 3×3 array portion 300 of this EPD 100. Each one of the nine cells, cells 302, 304, 306, 308, 310, 312, 314, 316, and 318, in the array portion 300 is connected to the drive voltage generator 116 via source lines 334, 336, 338, gate lines 328, 330, 332, and a common line. Each cell also represents a pixel and includes a pixel electrode, which is a part of the upper electrode 112 of the EPD 100, a common electrode, which is a part of the lower electrode 114, and a dispersion layer, which is a part of the electrophoretic dispersion layer 102. For example, cell 302 includes a pixel electrode 320, a dispersion layer 322, and a common electrode 324. Although FIG. 3 shows a separate common electrode 344 for the cell 304, one can implement the cells with a single common electrode.

In addition, the pixel electrode 320 is connected to the drain terminal of a transistor 326, which is configured to control the application of biasing voltages to the pixel electrode 320. In one alternative embodiment, a switching component other than a transistor, such as a diode, is used in place of the transistor 326. The gate terminal of transistor 326 is connected to a gate line 328, or G 328. The source terminal of the transistor 326 is connected to a source line 334, or S 334. As shown in FIG. 3, the first, second, and third rows of pixels in the array portion 300 are associated with a gate line 328 (G 328), gate line 330 (G 330), and gate line 332 (G 332), respectively. Similarly, the first, second, and third columns of pixels in the array portion 300 are associated with a source line 334 (S 334), source line 336 (S 336), and source line 338 (S 338), respectively.

Figure 4A:
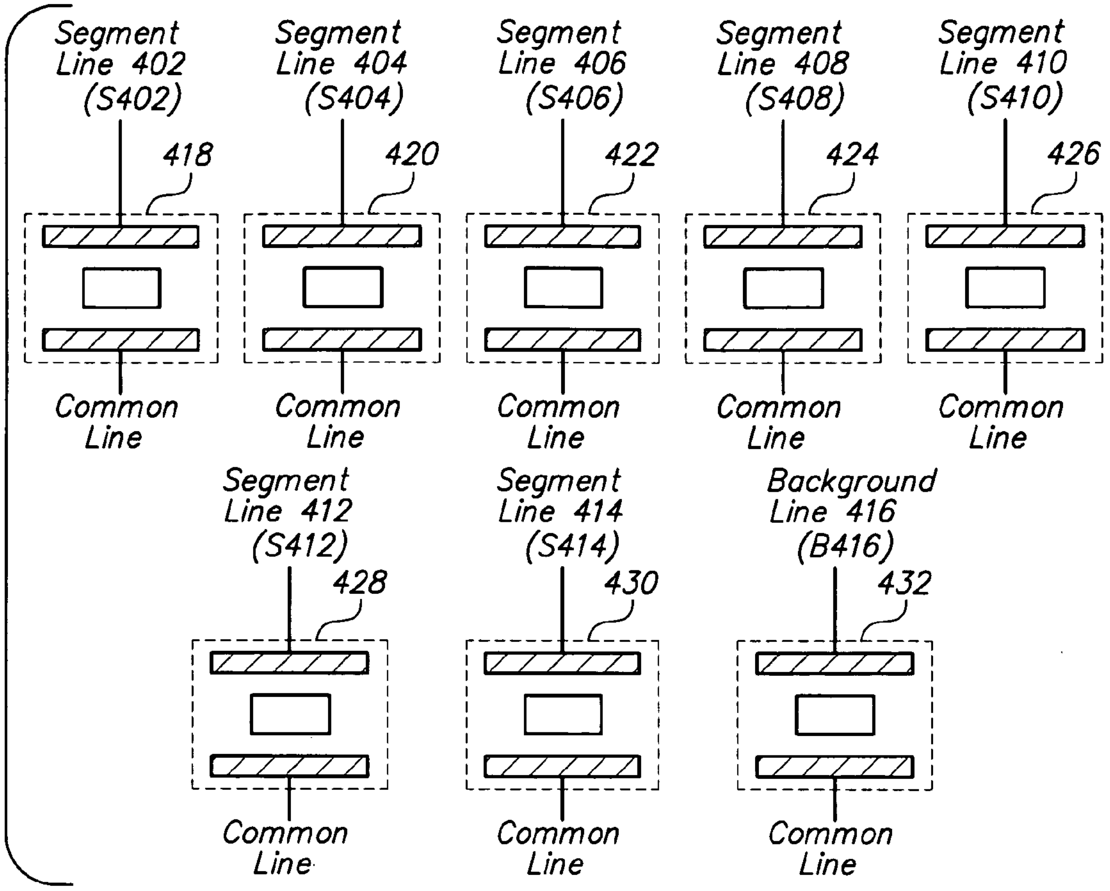
FIG. 4A illustrates one example characterization of the electrical connectivity between the drive voltage generator 116 and an EPD 100 with seven segments.
Figure 4B:
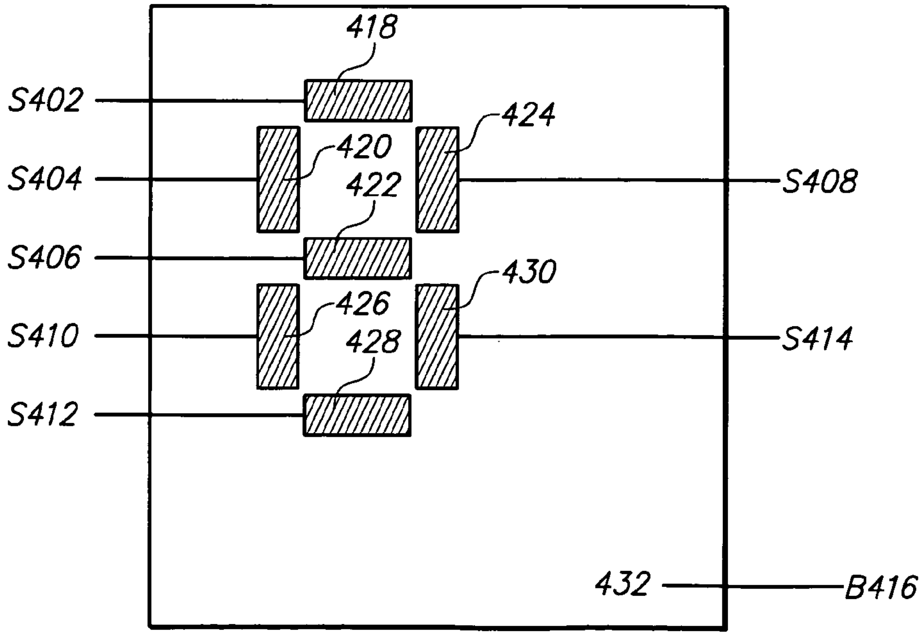
FIG. 4B illustrates a plain view of an embodiment of the EPD 100 with seven segments.

Alternatively, in a direct drive implementation of the EPD 100, FIG. 4A illustrates one example characterization of the electrical connectivity between drive voltage generator 116 and an EPD 100 with seven segments. The seven segments, 418, 420, 422, 424, 426, 428, and 430 are connected to the drive voltage generator 116 via segment lines 402, 404, 406, 408, 410, 412, and 414, respectively. In addition, the background 432 of this EPD 100 is associated with a background line 416. FIG. 4B illustrates a plain view of this embodiment of the EPD 100.

B. Overview of the Drive Voltage Generator

Figure 5A:
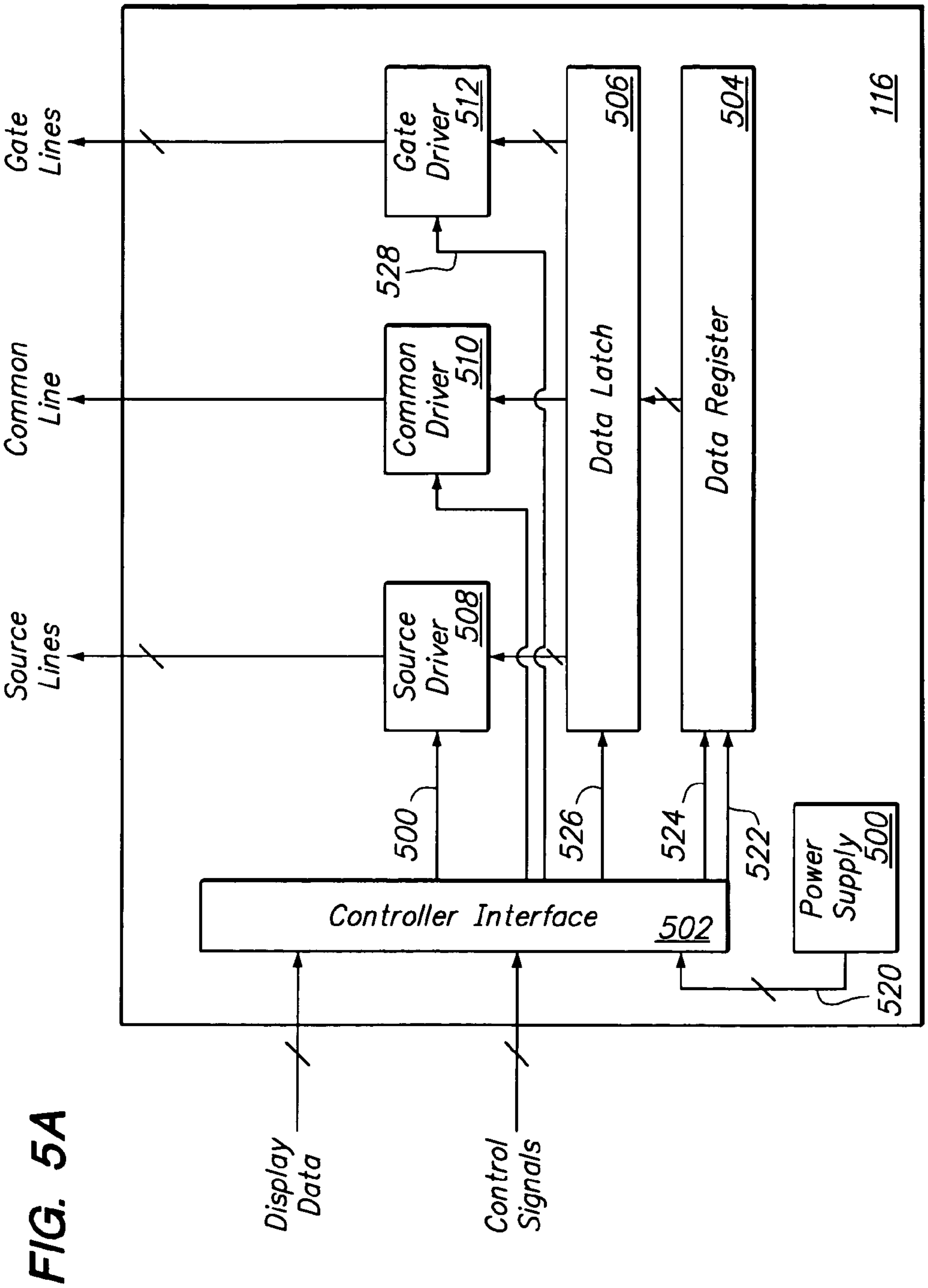
FIG. 5A illustrates a block diagram of an example embodiment of the drive voltage generator 116 in an active matrix implementation.

FIG. 5A illustrates a block diagram of an example embodiment of the drive voltage generator 116 in an active matrix implementation. The generator 116 includes a power supply 500, a controller interface 502, a data register 504, a data latch 506, and a bank of drivers including source driver 508, common driver 510, and gate driver 512. An alternative embodiment of the generator 116 uses an external power supply as opposed to the illustrated power supply 500. Either of the mentioned power supplies includes circuitry to generate multiple-level voltages. The controller interface 502 mainly relays the various voltage levels, control signals, and display data to the appropriate components of the generator 116. An alternative embodiment of the generator 116 includes an internal controller that generates the control signals. The data register 504 mainly stores the display data, and the data latch 506 mainly relays the stored data to the drivers, such as source driver 508, common driver 510, and gate driver 512. In one embodiment, based on the display data, drivers 508, 510, 512 deliver appropriate levels of voltages to the source lines, common line, and gate lines, respectively, of EPD 100.

One example process for the drive voltage generator 116 to drive display data to the EPD 100 involves a number of different control signals. For example, to transfer a certain level of voltage to the source lines, control signal 524 and control signal 526 are involved. Specifically, the control signal 524 enables the data register 504 to store the display data that are on a data line 522. Then, after the control signal 526 reaches a certain state, such as the falling edge of the signal, the data latch 506 transfers a portion of the stored display data to the drivers, such as the source driver 508. Based on certain bits in the display data, one embodiment of the source driver 508 transfers one of the multiple-level voltages 520 from the power supply 500 to the source lines. In addition, depending on the state of the driving cycle, the control signal 528 may cause the gate driver 512 to turn off the transistors on its gate lines, such as transistor 326 and transistor 346 on the gate line 328.

Figure 5B:
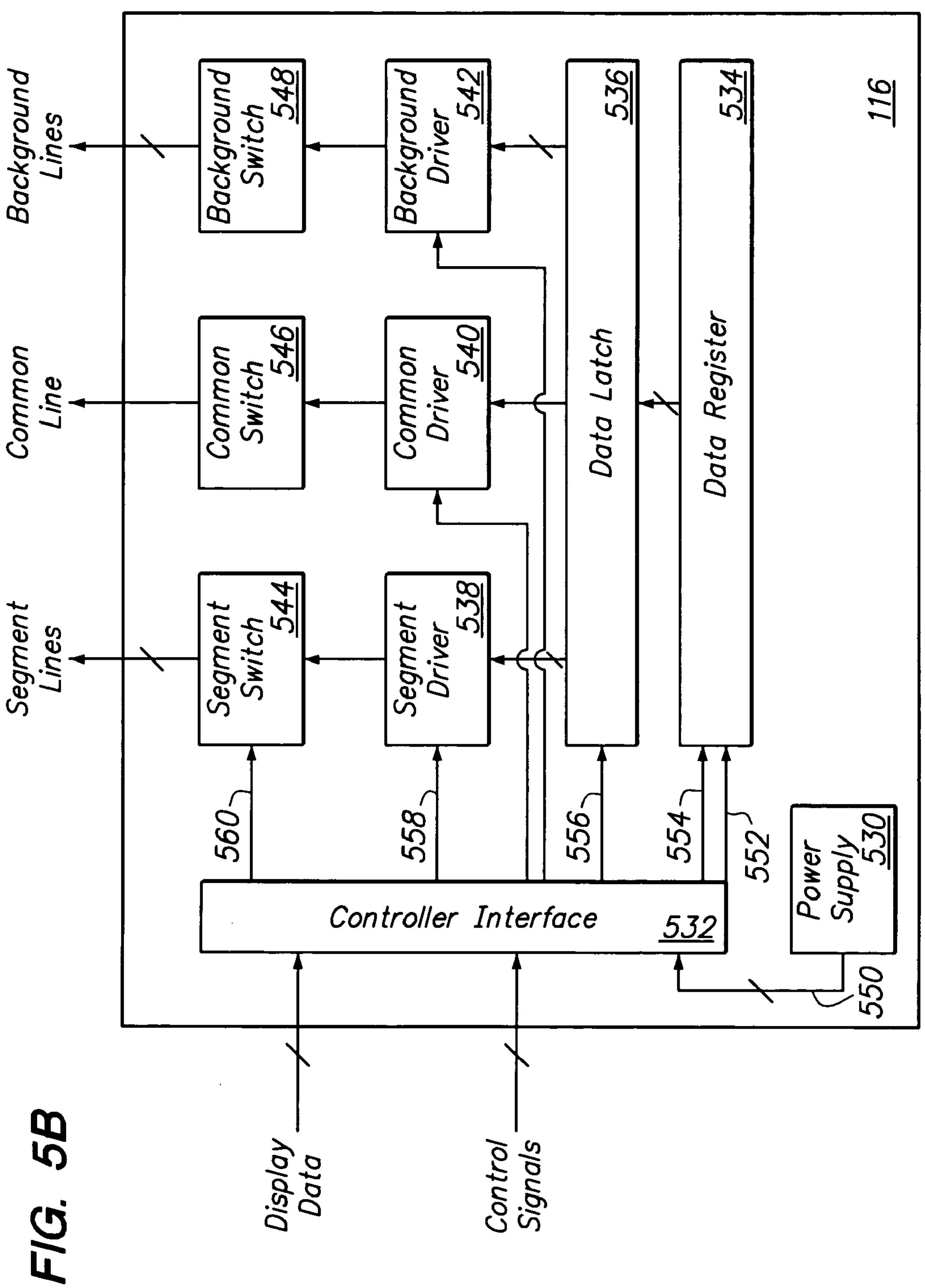
FIG. 5B illustrates a block diagram of an example embodiment of the drive voltage generator 116 in a direct drive implementation.

FIG. 5B illustrates a block diagram of an example embodiment of the drive voltage generator 116 in a direct drive implementation. The generator 116 includes a power supply 530, a controller interface 532, a data register 534, a data latch 536, a bank of drivers including segment driver 538, common driver 540, and background driver 542, and a bank of switches including segment switch 544, common switch 546, and background switch 548. The operations of this generator are similar to the aforementioned generator in the active matrix implementation, except for the addition of the bank of switches. For example, depending on the state of the driving cycle, the control signal 560 may cause the segment switch 544 to be turned off. In other words, the segment driver 538 becomes disconnected from the segment lines.

C. Use of Switches to Mitigate Effect of Reverse Bias

1. Active Matrix Implementation

The display states of the pixels shown in the array portion 300 of FIG. 3 may be controlled in any number of ways. Two typical approaches are the uni-polar or common switching approach and the bipolar approach. Under the uni-polar approach, all the pixels of the array are driven to their destined states in two driving phases. In phase one, selected pixels are driven to a first color state. In phase two, the other pixels are driven to a second color state that contrasts with the first. For example, in phase one, selected pixels may be driven in one embodiment to a first display state in which the charged pigment particles in the dispersion layers have been driven to a position at or near the pixel electrodes on the non-viewing side of the display. In phase two, the other pixels may then be driven to a second display state in which the charged pigment particles are in a position at or near the common electrode on the viewing side of the display. Alternatively, the opposite approach may involve first driving the charged pigment particles of the selected pixels to the viewing side of the display and then driving the particles of the other pixels to positions at or near the non-viewing side.

Under the bipolar approach, a driving biasing voltage of a first polarity drives the cells to a first display state, and a second biasing voltage of the opposite polarity drives those cells to a second state. For example, a positive bias voltage may be applied to the cells so that a state in which the charged pigment particles are at or near the viewing surface of the display is reached. A negative bias voltage may also be applied to those cells so that the charged pigment particles are in a position at or near the non-viewing side of the display.

a. Uni-Polar Approach

Using the cells 302 and 304 shown in FIG. 3 as an illustration, one example embodiment of the common electrodes 324 and 344 are transparent and are on the viewing side of the display. As mentioned above, one embodiment of the array portion 300 shares a single common electrode. Thus, the common electrodes 324 and 344 are the same common electrode. The dispersion layers 322 and 342 include a dielectric solvent and a number of charged pigment particles suspended in the solvent. For discussion purposes, assume that the positively charged pigment particles are white, and the solvent is black. Thus, when the particles are driven to the common electrodes 324 and 344, the color of the particles, white, will be displayed. When the particles are driven to the pixel electrodes 320 and 340, the color of the solvent, black, will be displayed. Black and white pixels or particles are not required; other embodiments may use any two contrasting colors.

Figure 6:
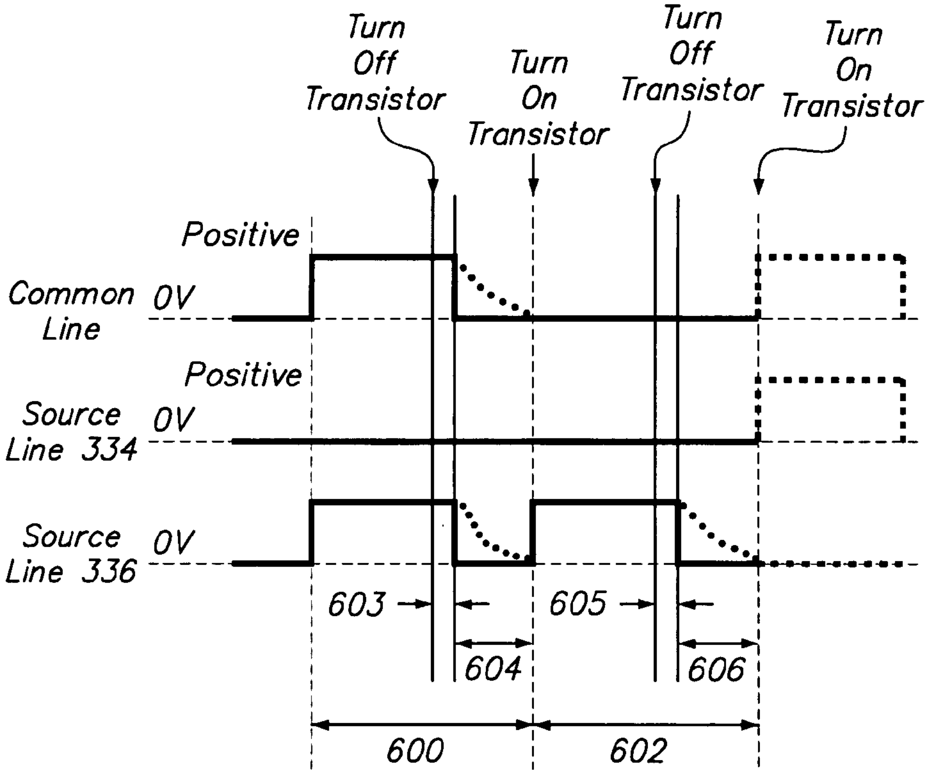
FIG. 6 shows a timing diagram of a driving cycle of two phases of an example embodiment of the drive voltage generator 116.

FIG. 6 shows a timing diagram of a driving cycle of two phases of an example embodiment of the drive voltage generator 116. During the first driving phase 600, the gate driver 512 as shown in FIG. 5A applies a high voltage to the gate line 328 and turns on the transistors 326 and 346. Also, the common driver 510 and the source driver 508 apply a positive voltage to the common line and the source line 336, respectively. The source line 334 is held at ground potential. Under such conditions, the cell 302 is driven to the state in which the color of the dielectric solvent in the dispersion layer 322, in this case black, is visible at the viewing surface of the display, because the white charged pigment particles have been driven to a position at or near the pixel electrode 320 on the non-viewing side of the display. Then the gate driver 512 applies a low voltage to the gate line 328 and in effect turns off the transistor 326. After a time period 603, the common line and the source line 334 are held at ground potential. This allows the charge on the cell 302 to be slowly discharged to 0 volt through the high impedance of the off transistor.

During the second driving phase 602, selected cells are driven to the white state. In one example case, the color of the dielectric solvent in the dispersion layer 342 is driven to the white state. The common line and source line 334 are held at ground potential and the source line 336 at a positive voltage level. The gate driver 512 applies a high voltage to the gate line 328 and turns on the transistor 346 to transfer the voltage on the source line 336 to the drain of the transistor 346 and to the pixel electrode 340. As a result, the white charged pigment particles in the dispersion layer 342 are driven to the position at or near the common electrode 344 on the viewing side of the display. Then the gate driver 512 applies a low voltage to the gate line 328 and in effect turns off the transistor 346. After a time period 605, the source line 336 is set to 0 volt. This also allows the charge on the cell 304 to be slowly discharged to 0 volt through the off transistor. The duration of the switch off time 604 and 606 depends on the characteristics of the electrophoretic dispersion, dielectric material, and the thickness of each layer.

b. Bipolar Approach

Figure 7:
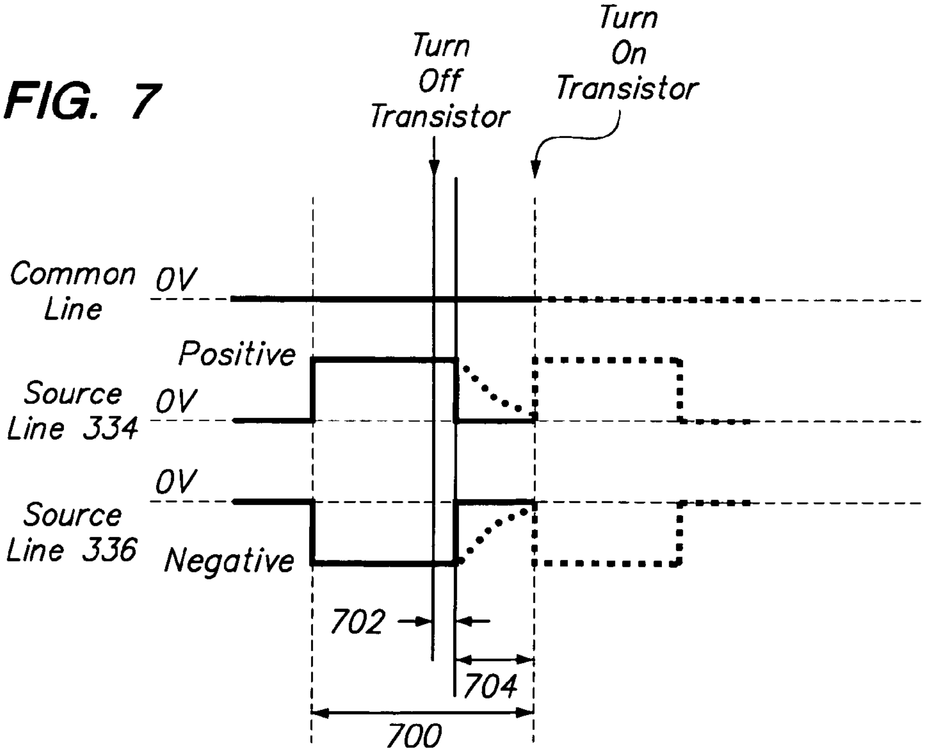
FIG. 7 illustrates a timing diagram of a single driving cycle employed by an example embodiment of the drive voltage generator 116.

FIG. 7 illustrates a timing diagram of a single driving cycle employed by an example embodiment of the drive voltage generator 116. In particular, the drive voltage generator 116 in a bipolar type active matrix EPD may drive the charged particles using either positive or negative drive voltage.

Using the cell 302 as shown in FIG. 3 in conjunction with FIG. 7, an appropriate level of voltage is applied to the gate line 328 in a driving cycle 700 to insure that the switching element, such as the transistor 326, is in a conducting, or on, state. In one implementation, if the display data indicate a showing of a white color, the common electrode 324 is held at ground potential, the source line 334 at a positive voltage level, and the source line 336 at a negative voltage level as shown in FIG. 7. This biasing condition causes the charged particles to move towards the common electrode 324 on the viewing side of the display. The source line 336 is held at a negative voltage level during the driving cycle 700 and results in the movement of the particles to the pixel electrode 340.

Similar to the uni-polar approach discussions above, one embodiment of the drive voltage generator 116 turns off the transistors 326 and 346 after all the cells are driven to the designated states. After time duration 702, all source lines are then set to ground (0 volt). The charge at each cell is then slowly discharged through the high impedance of the off transistor. The switch off duration of the transistor switch off time 704 depends on the characteristics of the electrophoretic dispersion, dielectric material, and the thickness of each layer.

2. Direct Drive Implementation

As an illustration, the direct drive implementation of the EPD 100 described in this section involves white positively charged pigment particles and either black or some other contrasting background color dielectric solvent. Also, as shown in FIG. 4A, this implementation includes a common electrode in an upper layer of the display, above an array of cells with electrophoretic dispersion layers, on the viewing surface side of the EPD and a number of segment electrodes in a lower layer of the display, below the array of the cells, on the non-viewing side of the display. Thus, the white pigment particles in the dispersion layers of the cells that are associated with segments can be driven towards the viewing surface to display a white color in those segments. Alternatively, the particles can also be driven to a position at or near the segment electrodes to display a black color or other background color in those segments.

a. Uni-Polar Approach

Figure 8A:
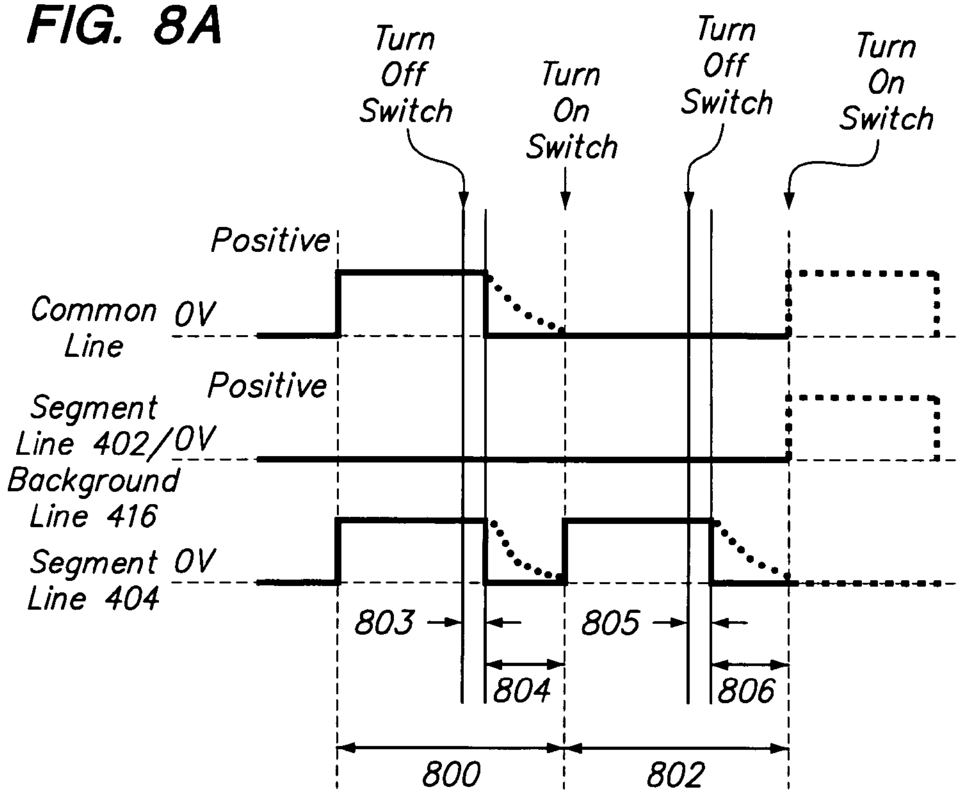
FIG. 8A illustrates a timing diagram of a driving cycle in a uni-polar direct drive implementation employed by an example embodiment of the drive voltage generator 116.

FIG. 8A illustrates a timing diagram of a driving cycle in a uni-polar direct drive implementation employed by an example embodiment of the drive voltage generator 116 as shown in FIG. 5B. Using the segments 426 and 430 as shown in FIGS. 4A and 4B and also in conjunction with FIGS. 5B and 8A, a uni-polar driving cycle comprises two driving phases. During phase 800, with the common switch 546 turned on, the common driver 540 drives the common electrode with a positive voltage. The segment electrode of the segment 426 is driven by the segment line 410 with 0 volt and with the segment switch 544 turned on. The background electrode of the background 432 is driven by the background line 416 with 0 volt and with the background switch 548 turned on. During this phase of the driving cycle, both the segment 426 and the background 432 show the background color, or black in this example. On the other hand, because the segment line 414 is driven to a positive voltage, which is the same as the voltage being applied to the common electrode, the color state of the segment 430 does not change.

After the segments reach their desired color states, the segment switch 544, the common switch 546, and the background switch 548 are turned off. After a time period 803, the drivers, such as 538, 540, and 542, set 0 volt on the lines. This allows the charges on the segments and the background to be slowly discharged to 0 volt through the high impedance of the off switches.

During phase 802, the common remains at 0 volt. The segment electrode of the segment 426 is driven by the segment line 410 with 0 volt and with the segment switch 544 turned on. The background electrode of the background 432 is driven by the background line 416 with also 0 volt and with the background switch 548 turned on. During this phase of the driving cycle, both the segment 426 and the background 432 show the color of the solvent (background), or black in this example. On the other hand, the segment line 414 is driven to a positive voltage. The segment 430 instead shows the color of the particles, or white in this example. After the segments reach their desired color states, the segment switch 544, the common switch 546, and the background switch 548 are turned off. After a time period 805, the drivers, such as 538, 540, and 542, set 0 volt on the lines. This allows the charges on the segments and the background to be slowly discharged to 0 volt through the high impedance of the off switches. The switch off duration of the transistor switch off time 804 and 806 depends on the characteristics of the electrophoretic dispersion, dielectric material, and the thickness of each layer.

b. Bi-Polar Approach

Figure 8B:
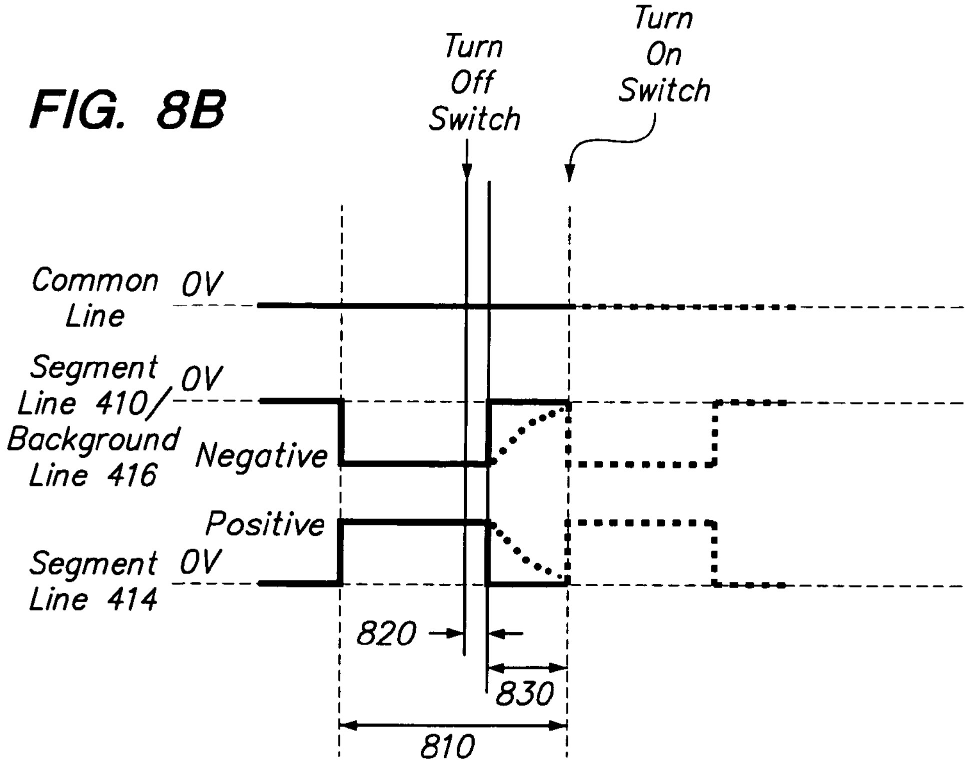
FIG. 8B illustrates a timing diagram of a driving cycle in a bi-polar direct drive implementation employed by an example embodiment of the drive voltage generator 116.

FIG. 8B illustrates a timing diagram of a driving cycle in a bi-polar direct drive implementation employed by an example embodiment of the drive voltage generator 116 as shown in FIG. 5B. Using the segments 426 and 430 as shown in FIGS. 4A and 4B and also in conjunction with FIGS. 5B and 8B, during a bi-polar driving cycle, with the common switch 546 turned on, the common driver 540 drives the common electrode with 0 volt. The segment electrode of the segment 426 is driven by the segment line 410 with a negative voltage and with the segment switch 544 turned on. The segment electrode of the segment 430 is driven by the segment line 414 with a positive voltage and with the segment switch 544 turned on. The background electrode of the background 432 is driven by the background line 416 with 0 volt and with the background switch 548 turned on. In this driving cycle, both the segment 426 and the background 432 show the background color, or black in this example. The segment 430, on the other hand, shows the color of the particles, or white in this example. After the segments and the background are driven to the designated states, the switches, such as 544, 546, and 548, are turned off. After a time period 820, the drivers, such as 538, 540 and 542, set 0 volt on the lines. This allows the charges on the segments and the background to be slowly discharged to 0 volt through the high impedance of the off switches. The switch off duration of the transistor switch off time 830 depends on the characteristics of the electrophoretic dispersion, dielectric material, and the thickness of each layer.

c. Pre-Drive Approach

Figure 8C:
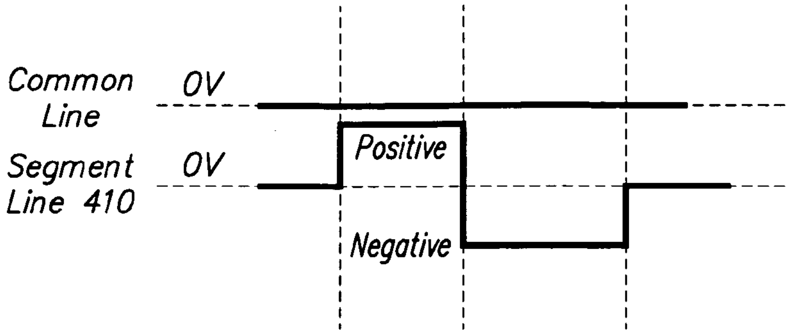
FIG. 8C illustrates a timing diagram of applying a pre-drive voltage in a bi-polar direct drive implementation employed by an example embodiment of the drive voltage generator 116.

In a typical EPD, the charge property of the particles relates to the field strength that the particles experience. For instance, after the particles are under a strong field for a period of time, the reverse bias effect is greatly reduced. Due to the capacitance characteristics of an EPD cell, the field strength is the strongest during the transition from a positive driving voltage to a negative driving voltage or vice versa. In FIG. 8C, a pre-drive voltage is applied to a pixel before the actual driving voltage is applied. Using a bi-polar direct drive system as an illustration, the segment line 410 is first set at a positive voltage for a period of time, and then it is set to a negative voltage in a normal driving cycle. It has been observed that even without turning off the segment switch 544 and the common switch 546, this pre-drive approach greatly reduces the reverse bias effect. It should be apparent to one with ordinary skill in the art to apply this pre-drive approach to a uni-polar direct drive EPD system, bi-polar active matrix EPD system, and uni-polar active matrix EPD system.

A plurality of pre-drive driving approaches for EPDs are now described with reference to FIG. 10 through FIG. 26, respectively.

Figure 10:
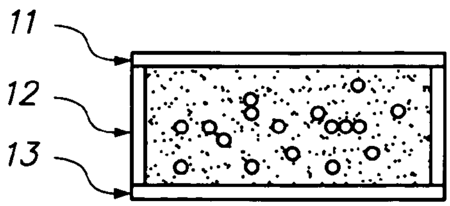
FIG. 10 is a block diagram of an example electrophoretic display (EPD) device.

To provide background, FIG. 10 is an example of an electrophoretic display (EPD) device. An EPD, especially a Microcup®-based EPD, usually comprises three layers, namely, an insulating layer (11), an electrophoretic fluid (i.e., dispersion layer 12) comprising charged pigment particles dispersed in a dielectric solvent or solvent mixture and a sealing layer (13). In FIG. 10, the sealing layer (13) is the non-viewing side whereas the insulating layer (11) is the viewing side. The insulating layer 11 may be formed from a material used for the formation of the microcup structure as described in co-pending application U.S. Ser. No. 09/518,488, the entire contents of which are incorporated herein by reference in its entirety for all purposes as if fully set forth herein.

Figure 11:
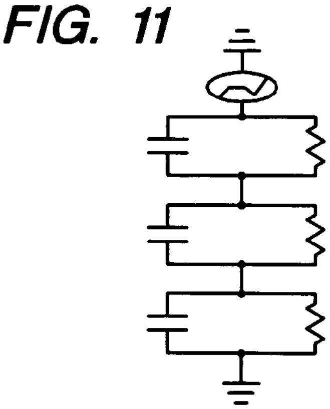
FIG. 11 is a schematic diagram of a circuit network that is electrically equivalent to the EPD device of FIG. 10.

FIG. 11 shows a circuit network that is electrically equivalent to the EPD device. This type of display devices often will experience the reverse bias problem as shown in FIG. 12 and FIG. 13.

In FIGS. 12–20, the solid line denotes the applied voltage and the dotted line denotes the voltage experienced by the particles in the dispersion layer. For illustration purpose, the particles, in FIGS. 12–20, are white and carry a positive charge and the dielectric solvent or solvent mixture in which the particles are dispersed is black. The use of white and black colors is not required; alternate embodiments may use any contrasting colors.

Figure 12:
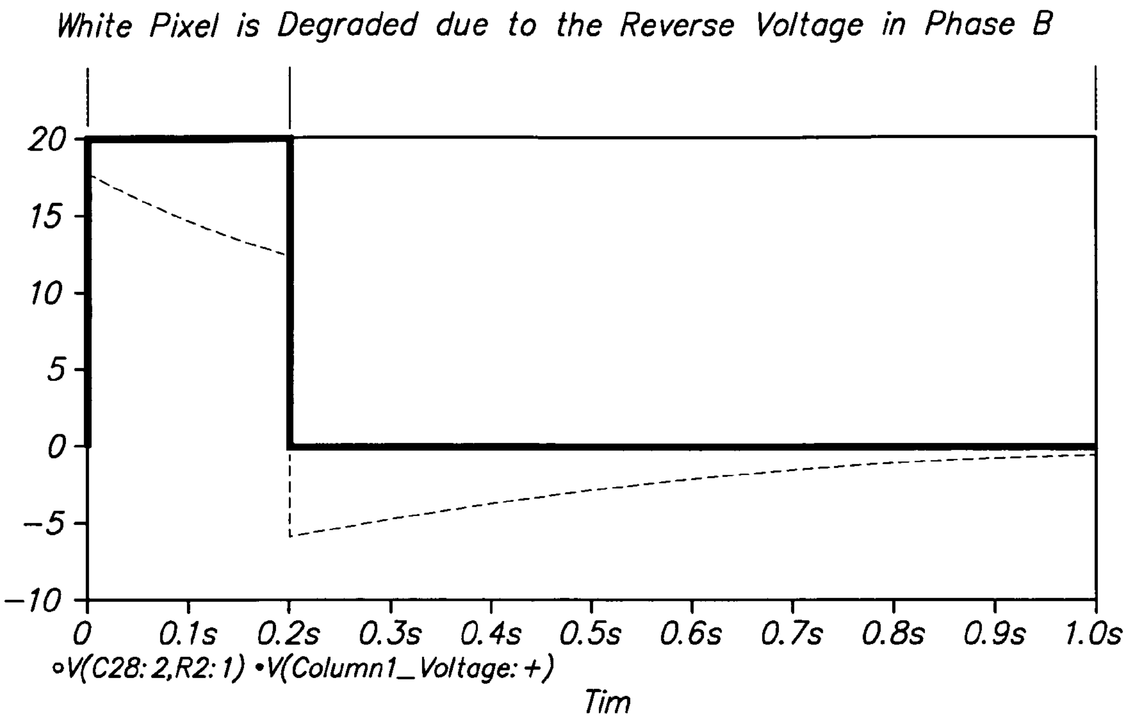
FIG. 12 is a time-versus-voltage plot diagram showing how a white pixel is degraded due to reverse bias.
Figure 13:
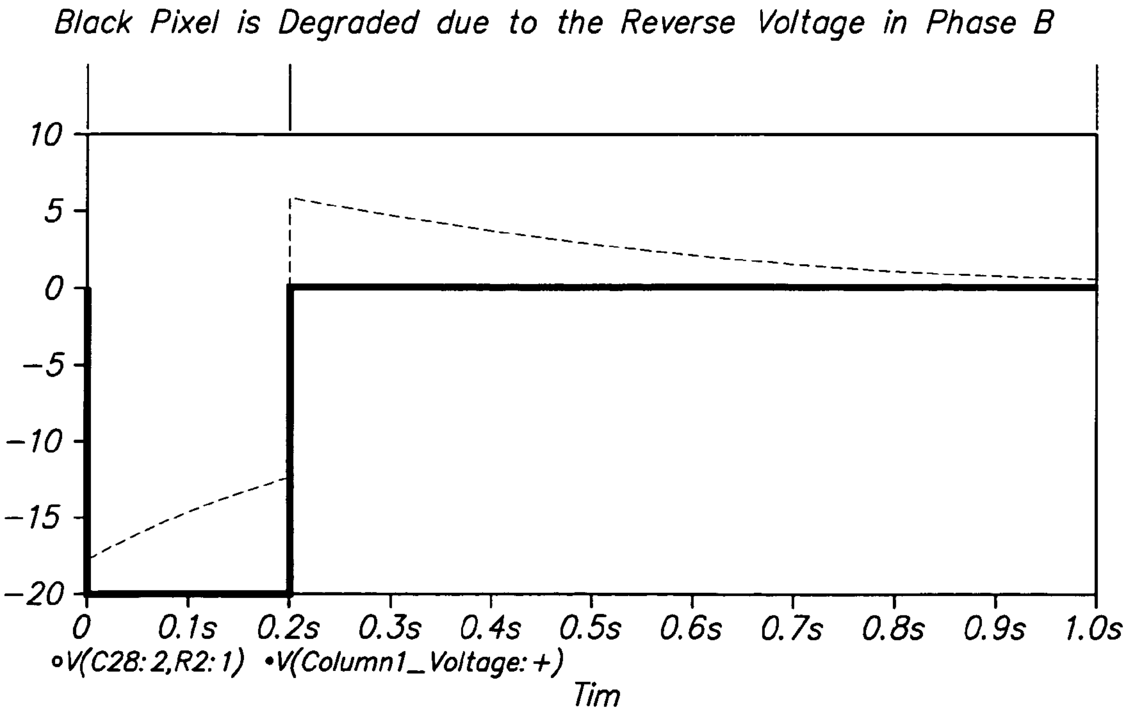
FIG. 13 is a time-versus-voltage plot diagram showing how a black pixel is degraded due to reverse bias.

According to FIG. 12, the particles in the dispersion layer would be moved to the viewing side (i.e., the white state) in Phase A and then experience an opposite voltage (i.e., reverse bias voltage) in Phase B, after the power is turned off. Such reverse bias effect causes degradation of the quality of the image shown (i.e., a degraded white state) because the particles at the top of the dispersion layer are dragged down by the opposite voltage.

The reverse bias phenomenon is caused by the capacitor charge holding characteristics of the insulating layer and the sealing layer. At any bias voltage transition, these layers, functioning as a capacitor, will not charge or discharge instantly. Without a special driving waveform design, a reverse polarity bias voltage will apply to the dispersion layer and cause particles migrate to the opposite direction of the desired state.

A similar degradation of the quality may also be observed with a black pixel, according to FIG. 13, due to the reverse bias effect.

Figure 14:
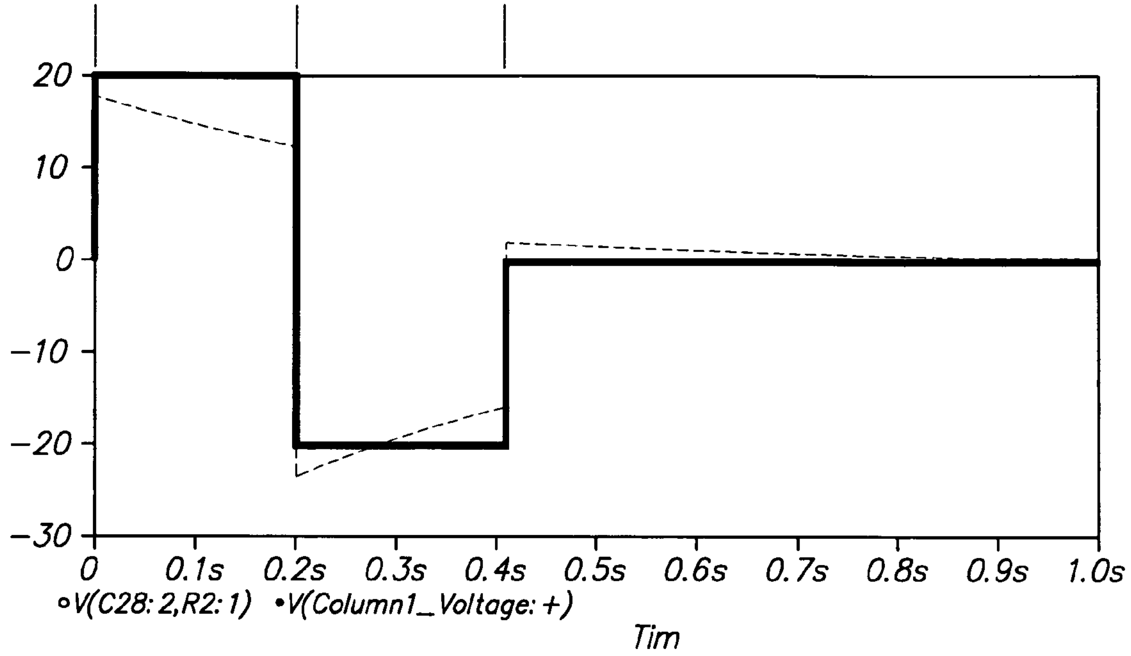
FIG. 14 is a time-versus-voltage plot diagram showing the use of separate pre-driving and driving phases for a black pixel with the same voltage amplitude and duration.

To resolve the reverse bias issue, according to one embodiment, driving Phase A is separated into two phases. The first phase is called the pre-driving phase, and the second phase is called the driving phase. The voltage amplitude and duration of the pre-driving phase are higher and longer, respectively, than the amplitude and duration of the driving phase, to overcome the reverse bias effect. Otherwise, the reverse bias effect will be present as illustrated in FIG. 14, in which the pre-driving and driving phases have the same voltage amplitude and the same duration. In the case of FIG. 14, the particles will experience a reverse voltage of about 5V at the beginning in Phase B.

The voltage amplitudes and durations of the two phases may be optimized, together or individually, to overcome the reverse bias effect.

Figure 15:
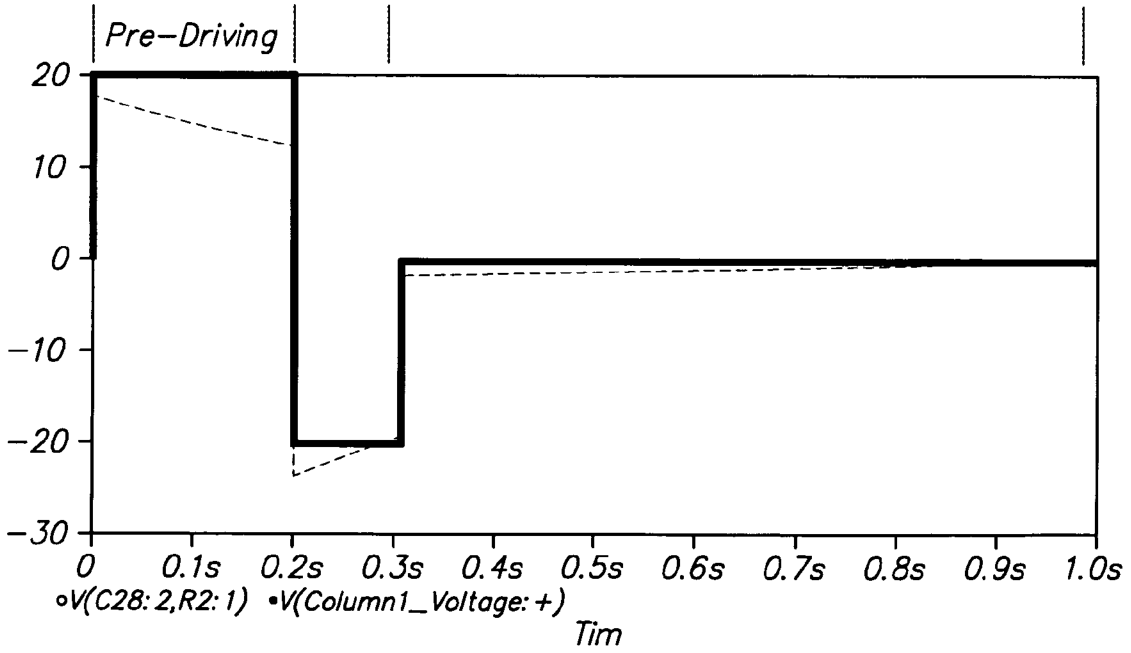
FIG. 15 is a time-versus-voltage plot diagram showing the use of separate pre-driving and driving phases with a longer duration for the pre-driving phase, as used for a black pixel.
Figure 16:
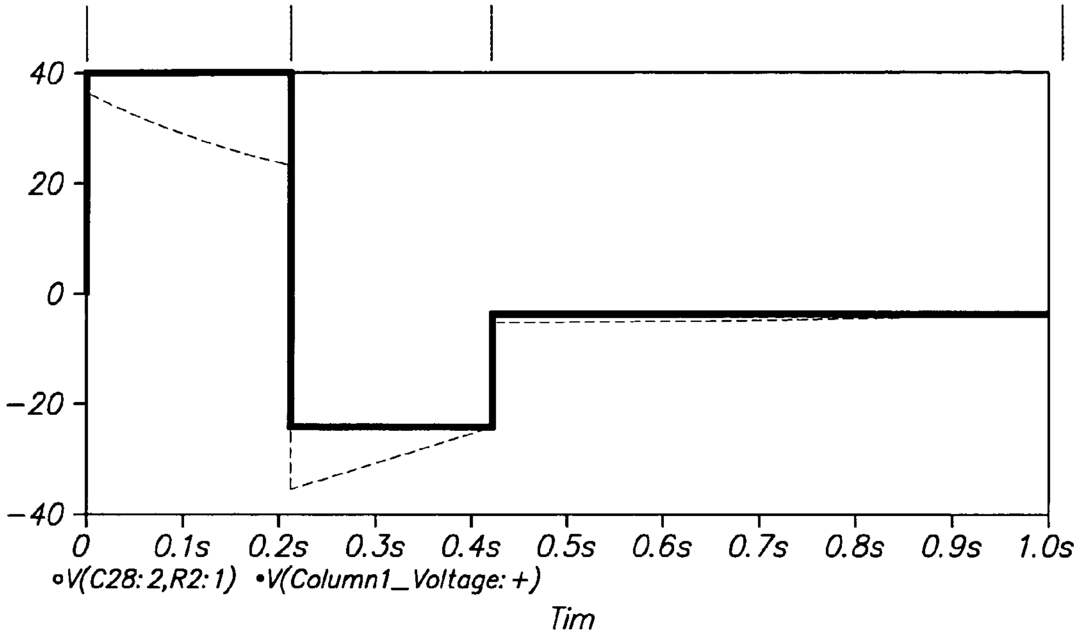
FIG. 16 is a time-versus-voltage plot diagram showing the use of separate pre-driving and driving phases with a higher driving amplitude for the pre-driving phase, as used for a black pixel.

FIG. 15 and FIG. 16 show how a black pixel is driven. In FIG. 15, the pre-driving phase has a longer driving duration than that of the driving phase, but the two phases have the same driving voltage amplitude. The reverse bias voltage is removed and the negative bias voltage in Phase B will help particles stay at the bottom of the dispersion layer. In FIG. 16, the driving durations in the pre-driving and driving phases are the same but the pre-driving phase has a higher voltage amplitude than the driving phase. The particles therefore experience a negative bias voltage in Phase B which will keep them staying at the bottom of the dispersion layer.

Figure 17:
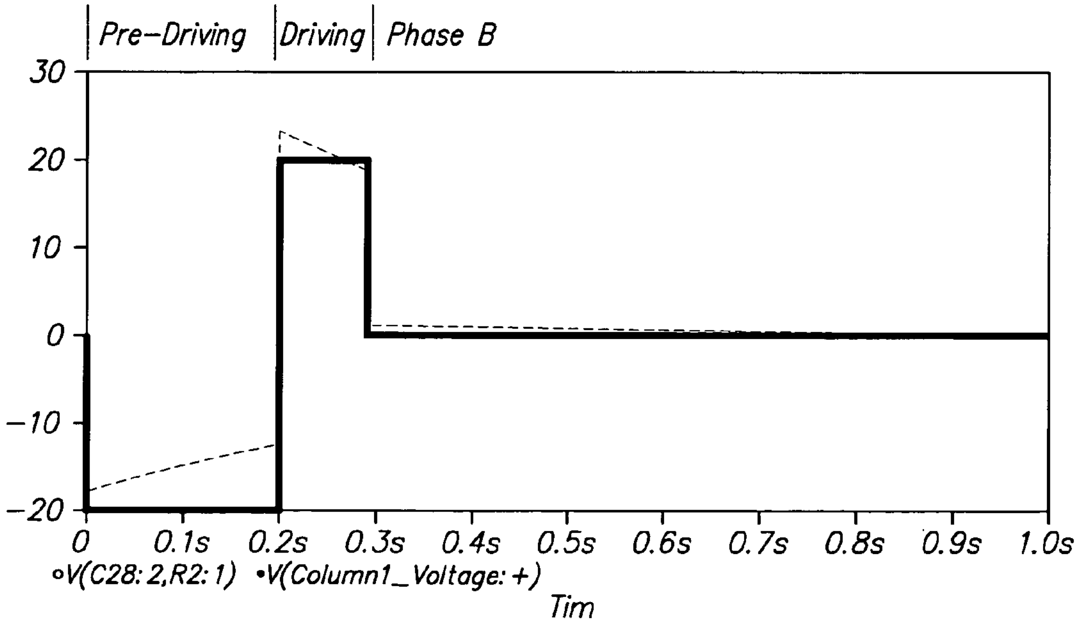
FIG. 17 is a time-versus-voltage plot diagram showing the use of separate pre-driving and driving phases with a longer duration for the pre-driving phase, as used for a white pixel.
Figure 18:
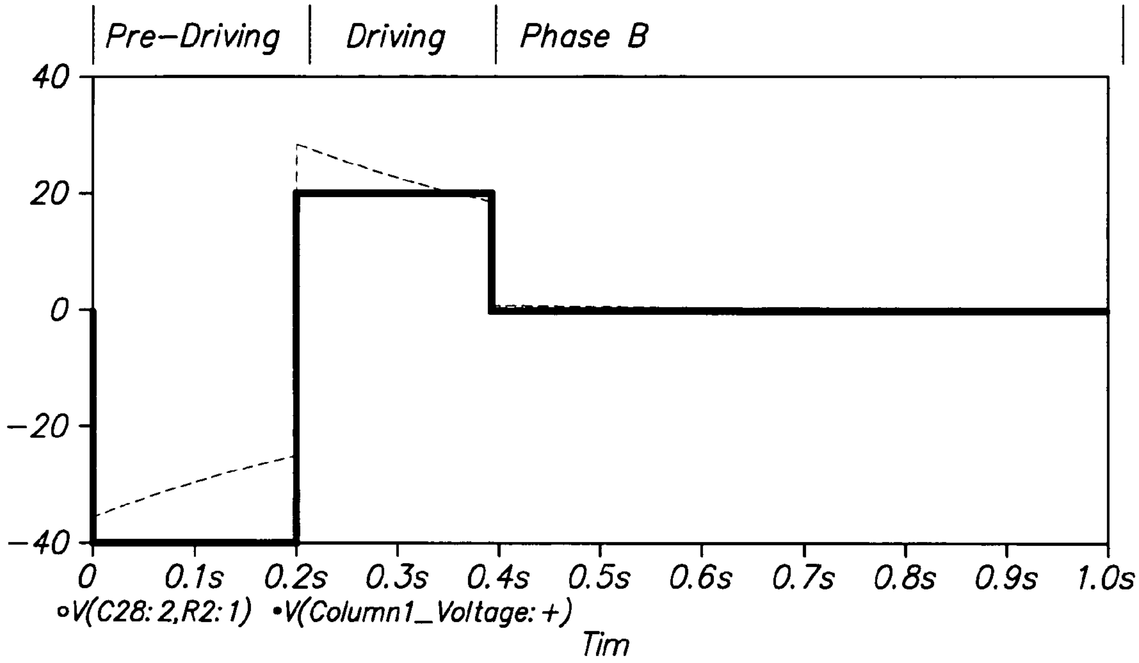
FIG. 18 is a time-versus-voltage plot diagram showing the use of separate pre-driving and driving phases with a higher driving amplitude for the pre-driving phase, as used for a white pixel.

FIG. 17 and FIG. 18 show how a white pixel is driven. The positive bias voltage experienced by the particles in Phase B is helpful to keep the white particles staying at the top of the dispersion layer.

Figure 19:
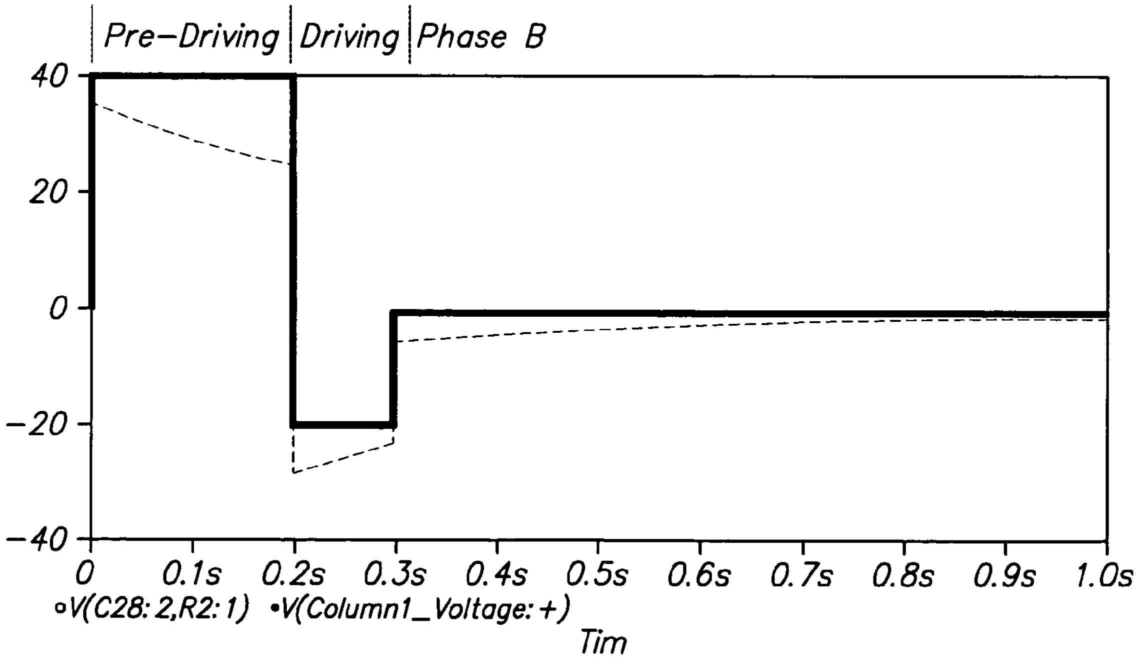
FIG. 19 is a time-versus-voltage plot diagram showing the use of separate pre-driving and driving phases with both a higher driving amplitude and a longer driving duration for the pre-driving phase, as used for a black pixel.
Figure 20:
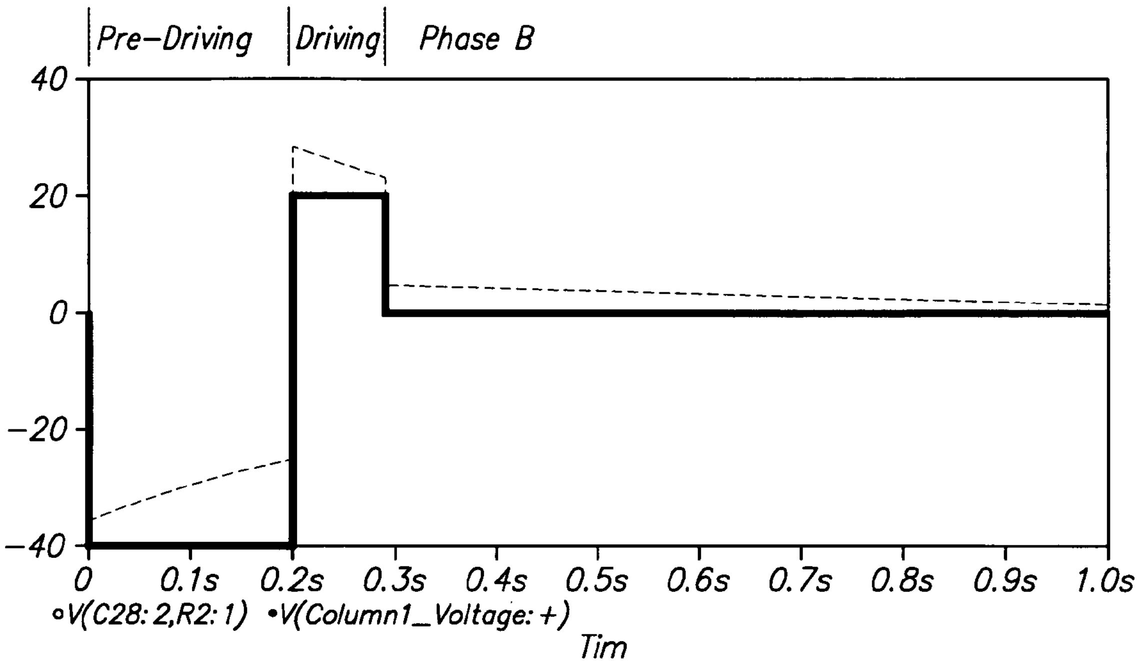
FIG. 20 is a time-versus-voltage plot diagram showing the use of separate pre-driving and driving phases with both a higher driving amplitude and a longer driving duration for the pre-driving phase, as used for a white pixel.

FIG. 19 and FIG. 20 show that both the driving voltage amplitude and the duration of the pre-driving phase are adjusted. The driving voltage amplitude of the pre-driving phase is higher and the driving duration of the pre-driving phase is longer, than those of the driving phase in FIGS. 19, 20. The bias voltages of Phase B that can maintain the particles at their intended positions in FIG. 19 and FIG. 20 are even higher than those in which only one of the driving voltage amplitude and duration is optimized (FIGS. 15–18).

FIGS. 21–25 present a plurality of alternative approaches that address the foregoing problems.

Figure 21:
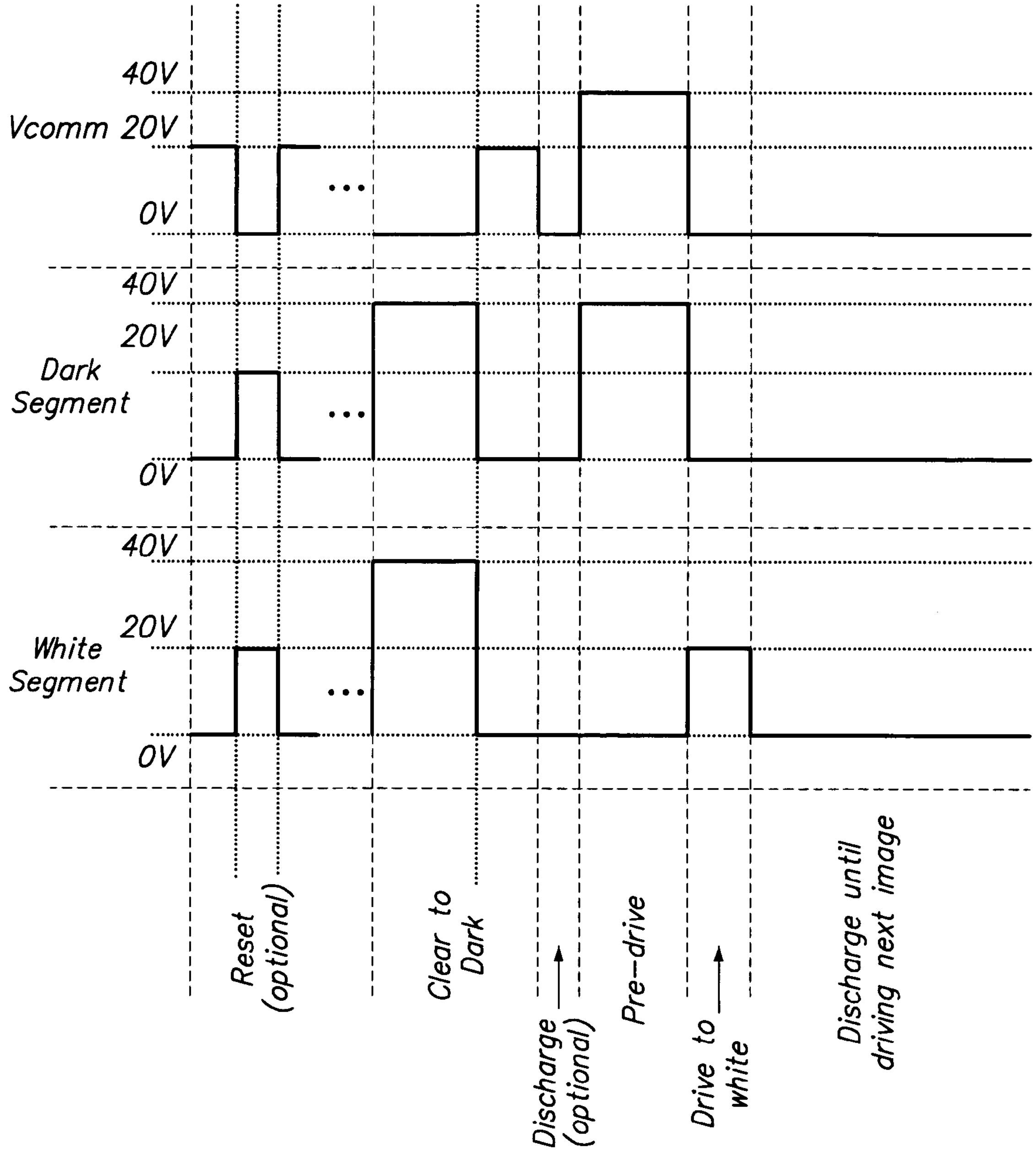
FIG. 21 is a signal pulse timing diagram for a first driving scheme.

In Scheme I as shown in FIG. 21, after reset, the display is cleared to its dark state and then white pixels are driven according to the intended image. To show a dark image on a white background, one can swap the voltages applied to $V_{comm}$ and Segments.

Figure 22:
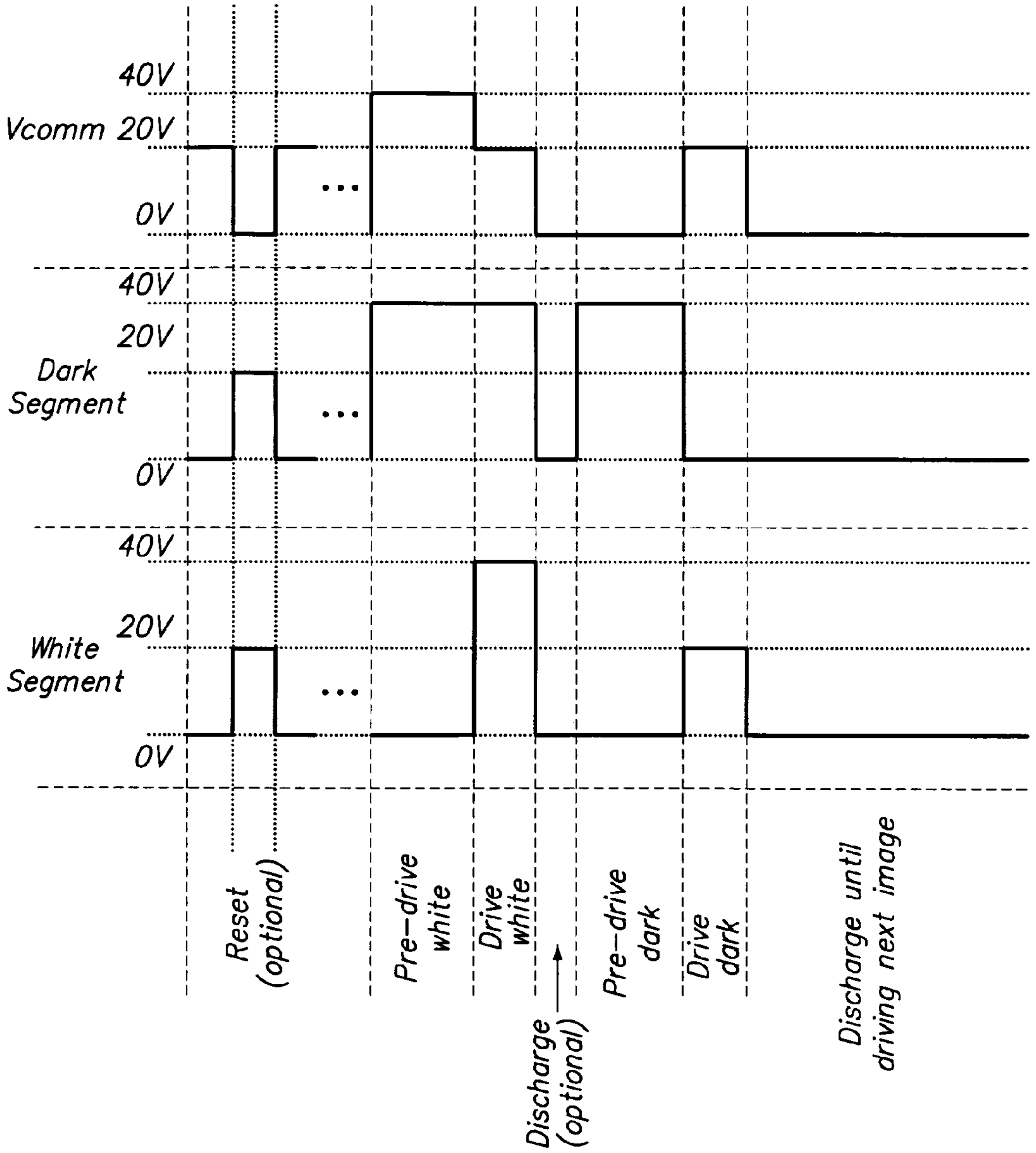
FIG. 22 is a signal pulse timing diagram for a second driving scheme.
Figure 23:
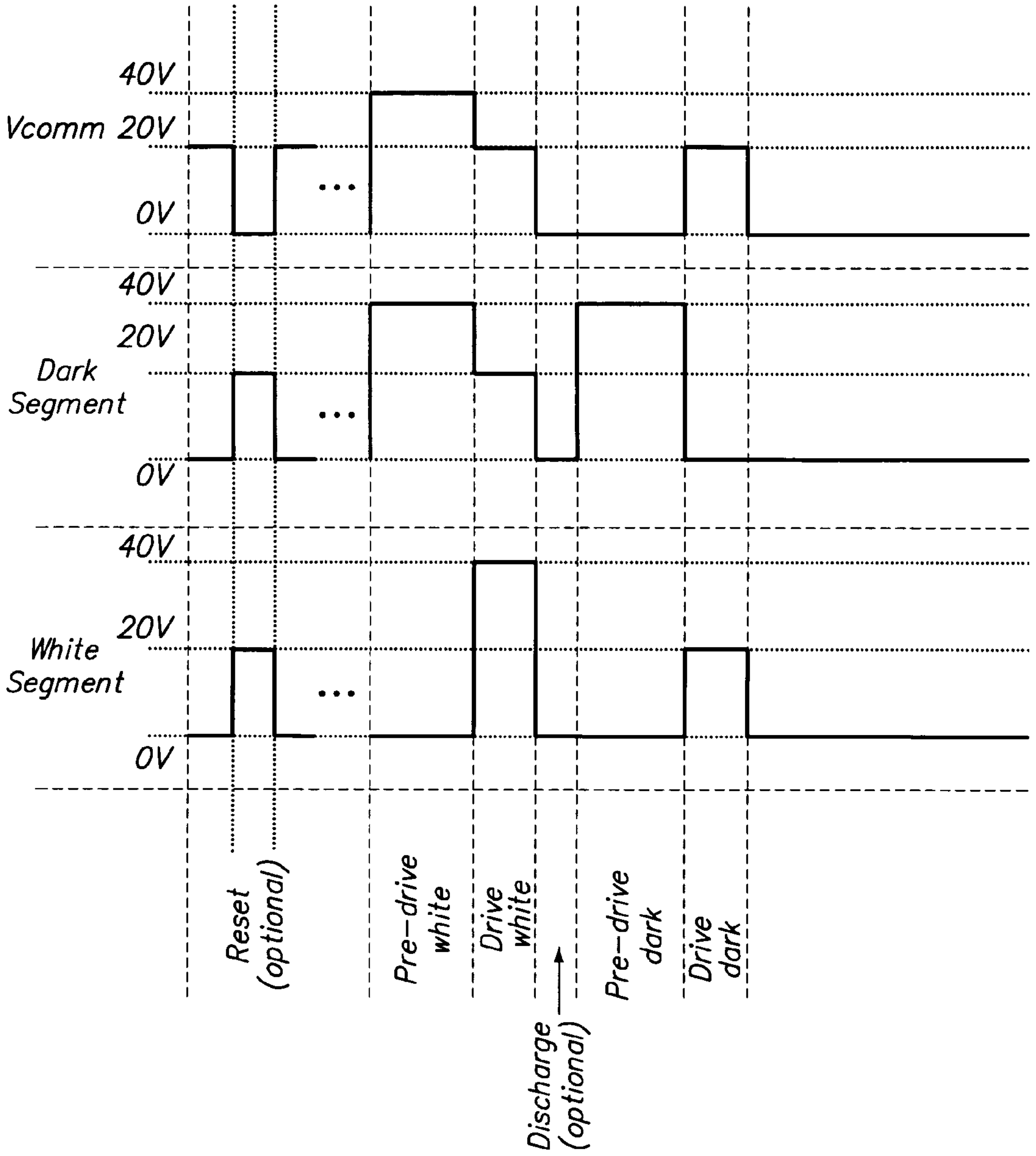
FIG. 23 is a signal pulse timing diagram for a third driving scheme.
Figure 24:
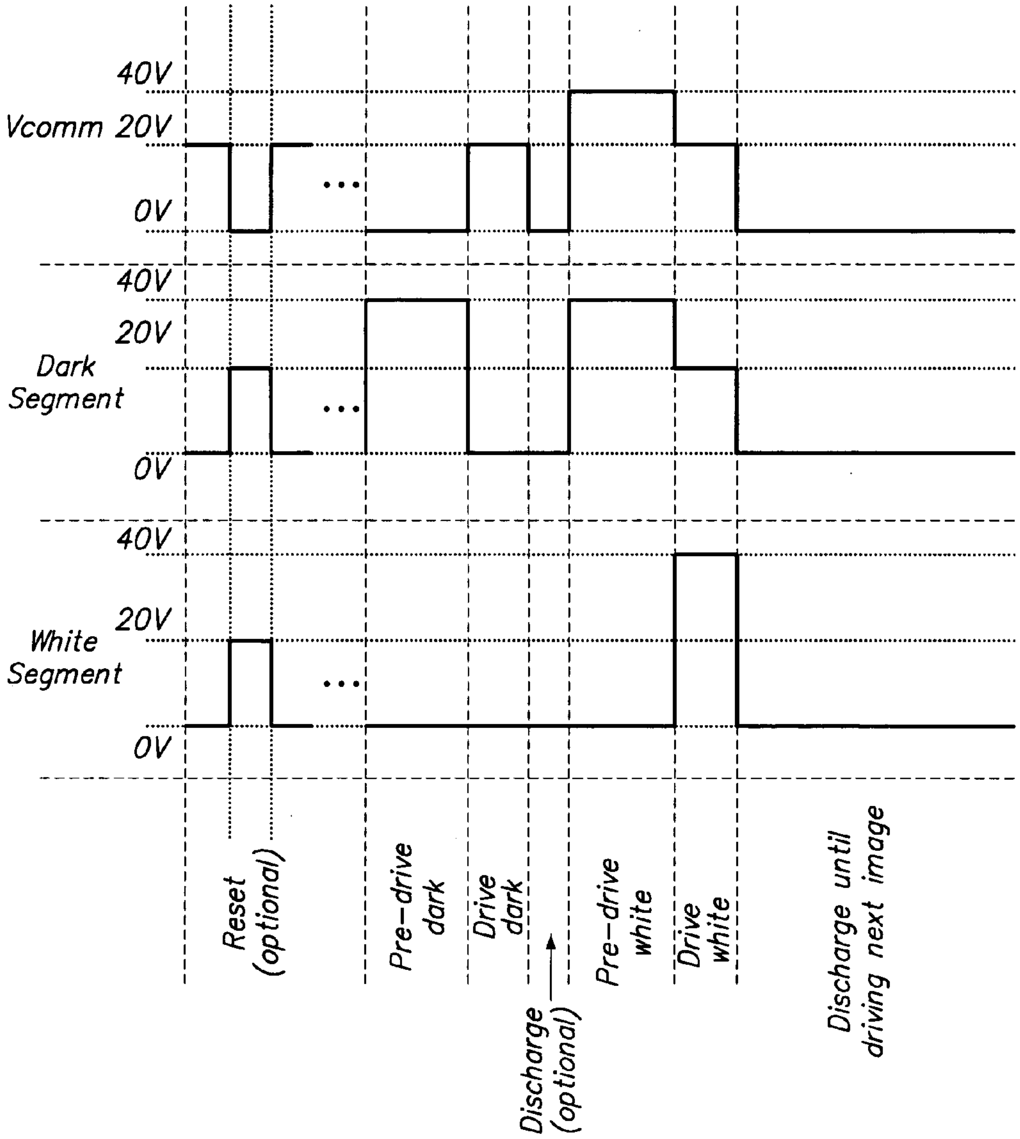
FIG. 24 is a signal pulse timing diagram for a fourth driving scheme.
Figure 25:
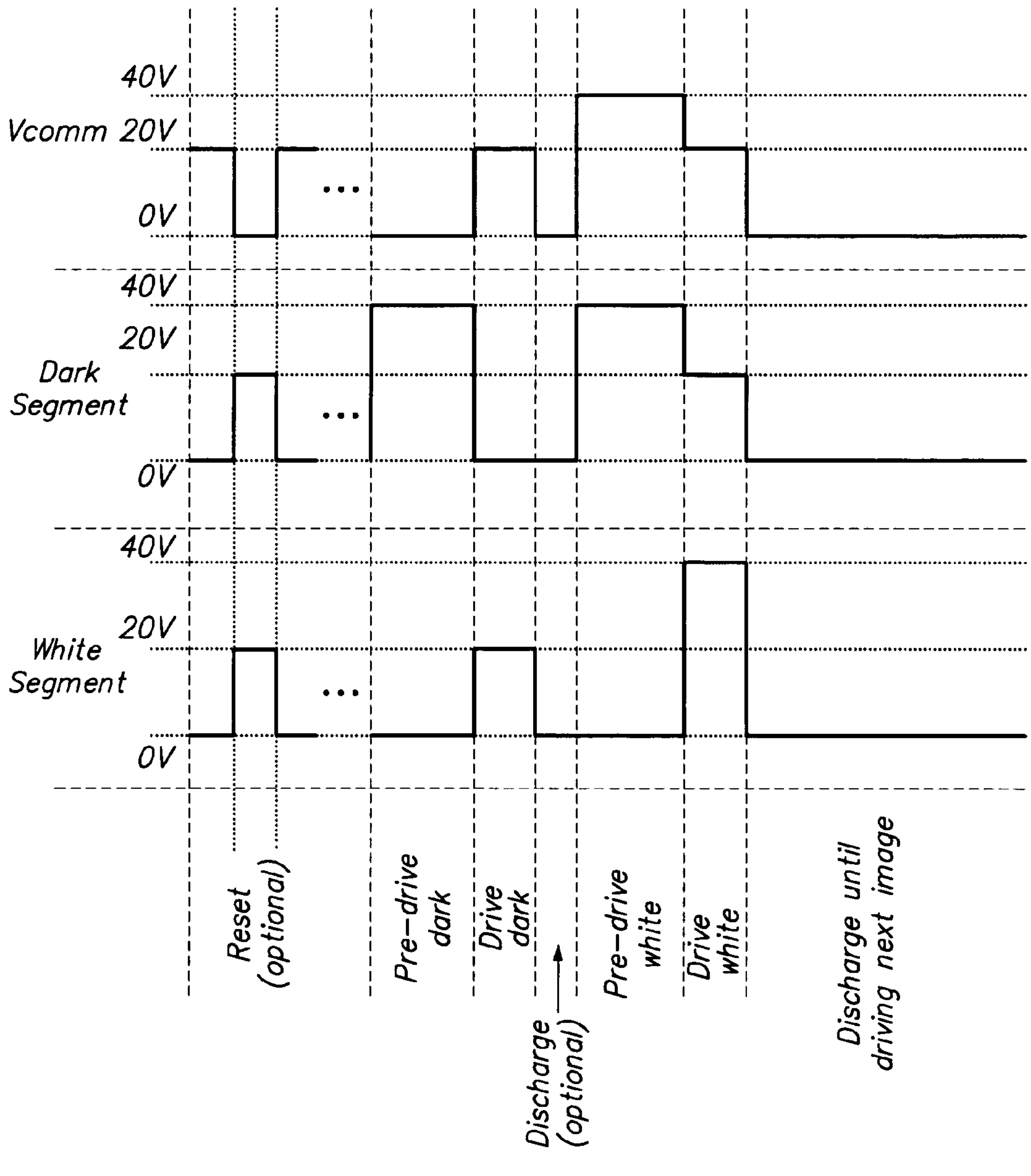
FIG. 25 is a signal pulse timing diagram for a fifth driving scheme.

In Scheme II as shown in FIG. 22, resetting the display is optional. The white pixels are driven first and then the dark pixels. Scheme III in FIG. 23 is the same as Scheme II except that the dark pixels have less pre-drive time. Scheme IV in FIG. 24 is the same as Scheme II except that the dark pixels are driven first in Scheme IV. Scheme V in FIG. 25 is the same as Scheme III except the white pixels have less pre-drive time in Scheme V.

The voltage and duration of each phase of the driving schemes may be adjusted, according to specific display and driver requirements, based on the pre-drive mechanisms disclosed above.

D. Example Systems and Applications

Figure 9:
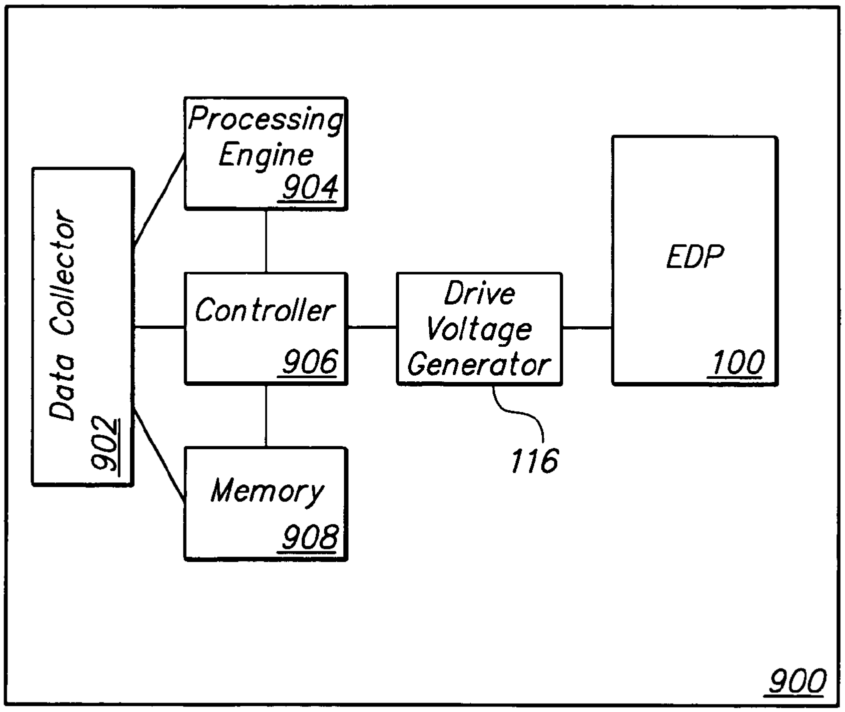
FIG. 9 illustrates one example system that includes the EPD 100 and the drive voltage generator 116.

FIG. 9 illustrates one example system that includes the EPD 100 as shown in FIG. 1A and the drive voltage generator 116 as shown in FIG. 5. The system 900 also includes a data collector 902, a processing engine 904, a controller 906, and memory 908. The data collector 902 is mainly responsible for retrieving display data from various content sources, such as, without limitation, any form of storage medium (e.g., compact disks, DVDs, hard drives, tape drives, memory, etc.) and online content and through various communication channels, such as terrestrial, wireless, and infrared connections. The processing engine 904, together with memory 908, can process the retrieved display data, such as decoding, filtering, or modifying. Also, the engine can also work with the controller 906 to issue control signals to the drive voltage generator 116.

Numerous applications utilize the illustrated system 900 in one form or another. Some examples include, without limitation, electronic books, personal digital assistants, mobile computers, mobile phones, digital cameras, electronic price tags, digital clocks, smart cards, and electronic papers.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the improved driving scheme for an electrophoretic display. Accordingly, the present embodiments are to be considered as illustrative and not restrictive, and the invention is not to be limited to the details given herein, but may be modified within the scope and equivalents of the appended claims.

What is claimed is:

1. A method for driving an electrophoretic display, the method comprising:

applying a first nonzero voltage, having a first polarity, across an array of electrophoretic display cells of the electrophoretic display for a duration of time before initiating a driving cycle; followed immediately by applying a second nonzero voltage, having a second polarity opposite the first polarity, across the array of the electrophoretic display cells to move the electrophoretic display cells towards a stable state in the driving cycle.

2. The method according to claim 1, further comprising:

disconnecting the second voltage from the electrophoretic display cells for a first time duration prior to reaching step transitions of the voltages during the driving cycle.

3. The method of claim 2, further comprising:

maintaining the disconnection between the second voltage and the electrophoretic display cells for a second time duration in addition to the first time duration.

4. The method of claim 3, further comprising:

discharging the stored charges in the electrophoretic display within the first time duration and the second time duration before reestablishing connection between the second voltage and the electrophoretic display cells.

5. A method, comprising:

applying a first nonzero voltage, having a first polarity, across an array of electrophoretic display cells of an electrophoretic display, for a first time period, followed immediately by applying a second nonzero voltage, having a second polarity opposite the first polarity, to the array of electrophoretic display cells for a second time period to move the electrophoretic display cells towards a stable state; and applying about a zero voltage to the array of electrophoretic display cells for a third time period while the electrophoretic display cells remain at the stable state.

6. A method as recited in claim 5, wherein the first time period is longer than the second time period.

7. A method as recited in claim 5, wherein the first voltage has a first amplitude and the second voltage has a second amplitude and the first amplitude is greater than the second amplitude.

8. A method as recited in claim 5, wherein the first time period is longer than the second time period, and wherein the first voltage has a first amplitude and the second voltage has a second amplitude and the first amplitude is greater than the the second amplitude.

9. A method as recited in any of claims 5, 6, 7, or 8, further comprising applying a reset signal to the display before applying the first voltage and second voltage.

10. A method as recited in claim 5, wherein the electrophoretic display comprises a first plurality of display pixels that display in a first color and a second plurality of display pixels that display in a second color, wherein the first color contrasts with the second color, the method further comprising:

driving all of the pixels using a third voltage that clears the display to a second color state; and thereafter, performing the steps of applying the first voltage and applying the second voltage to the first plurality of pixels.

11. A method as recited in claim 10, further comprising:

(a) performing the steps of applying the first voltage and applying the second voltage to the pixels of the first color; and thereafter, (b) performing the steps of applying the first voltage and applying the second voltage to the pixels of the second color, wherein the first polarity that is applied in step (a) is opposite to the first polarity that is applied in step (b), and wherein the second polarity that is applied in step (a) is also opposite the second polarity that is applied in step (b).

12. A method as recited in claim 11, wherein in step (b) the first time period is shorter than the second time period.

13. A method as recited in claim 10, further comprising:

(a) performing the steps of applying the first voltage and applying the second voltage to the pixels of the second color; and thereafter, (b) performing the steps of applying the first voltage and applying the second voltage to the pixels of the first color, wherein the first polarity that is applied in step (a) is opposite to the first polarity that is applied in step (b), and wherein the second polarity that is applied in step (a) is also opposite the second polarity that is applied in step (b).

14. A method as recited in claim 11, wherein in step (a) the first time period is shorter than the second time period.

* * * * *